(12) United States Patent
Rebmann et al.

(10) Patent No.: US 10,479,507 B2
(45) Date of Patent: Nov. 19, 2019

(54) AIRPLANE SEAT DEVICE

(71) Applicant: RECARO Aircraft Seating GmbH & Co. KG, Schwaebisch Hall (DE)

(72) Inventors: Juergen Rebmann, Neuenstadt (DE); Dietmar Schmeer, Braunsbach (DE); Mohammed Daher, Waiblingen (DE); Gunther Jaeger, Sulzbach-Laufen (DE); Andreas Wagner, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 175 days.

(21) Appl. No.: 15/321,212

(22) PCT Filed: Jul. 2, 2015

(86) PCT No.: PCT/EP2015/065132
§ 371 (c)(1),
(2) Date: Dec. 22, 2016

(87) PCT Pub. No.: WO2016/001375
PCT Pub. Date: Jan. 7, 2016

(65) Prior Publication Data
US 2017/0152047 A1 Jun. 1, 2017

(30) Foreign Application Priority Data
Jul. 2, 2014 (DE) .......................... 10 2014 109 285

(51) Int. Cl.
*B64D 11/06* (2006.01)
*B60N 2/427* (2006.01)

(52) U.S. Cl.
CPC ...... *B64D 11/0619* (2014.12); *B60N 2/42709* (2013.01); *B60N 2/42745* (2013.01)

(58) Field of Classification Search
CPC ............ B60N 2/42745; B60N 2/42709; B64D 11/0619
(Continued)

(56) References Cited

U.S. PATENT DOCUMENTS 2,660,222 A 11/1953 Woodsworth
5,454,622 A 10/1995 Demopoulos
(Continued)

FOREIGN PATENT DOCUMENTS

DE 19853981 A1 7/1999
DE 102011122186 A1 7/2013
(Continued)

OTHER PUBLICATIONS

German Search Report dated May 22, 2015 for the corresponding DE application No. 10 2014 109 285.6 (Partial translation attached.).
(Continued)

*Primary Examiner* — Milton Nelson, Jr.
(74) *Attorney, Agent, or Firm* — Posz Law Group, PLC

(57) ABSTRACT

An airplane seat device having at least one backrest, at least one seat component coupled to the backrest and a backrest impact safety device which, by partially decoupling the backrest from the seat component, is provided to at least partly reduce impact forces on the backrest at least in the event of crash. The backrest impact safety device is provided to decouple the backrest from the seat component before the impact forces takes effect.

15 Claims, 10 Drawing Sheets

(58) Field of Classification Search
USPC .................. 297/216.14, 216.13, 216.15
See application file for complete search history.

(56) References Cited

U.S. PATENT DOCUMENTS

| | | | |
|---|---|---|---|
| 6,224,131 B1 | 5/2001 | Shammout | |
| 6,244,656 B1 | 6/2001 | Mueller | |
| 7,401,852 B2 * | 7/2008 | Humer | B60N 2/4228 |
| | | | 297/216.13 |
| 2010/0013279 A1 * | 1/2010 | Cailleteau | B60N 2/2209 |
| | | | 297/216.13 |
| 2014/0070578 A1 | 3/2014 | Szelagowski et al. | |

FOREIGN PATENT DOCUMENTS

| | | |
|---|---|---|
| DE | 102012108352 A1 | 3/2014 |
| EP | 0556884 A2 | 8/1993 |
| WO | 2010/054411 A1 | 5/2010 |

OTHER PUBLICATIONS

International Search Report dated Feb. 10, 2015 for the corresponding international application No. PCT/EP2015/065132.
International Preliminary Report on Patentability dated Jan. 3, 2017 for the corresponding international application No. PCT/EP2015/065132.
International Search Report dated Feb. 10, 2015 for the corresponding international application No. PCT/EP2015/065130.
International Preliminary Report on Patentability dated Jan. 3, 2017 for the corresponding international application No. PCT/EP2015/065130.
Office action dated Sep. 12, 2018 issued in corresponding EP patent application No. 15733464.0.
Office action dated Sep. 5, 2018 issued in corresponding EP patent application No. 15733750.2.
Office action dated Aug. 30, 2019 issued in corresponding EP patent application No. 15733750.2 (and English translation thereof).

* cited by examiner

AIRPLANE SEAT DEVICE

CROSS REFERENCE TO RELATED APPLICATIONS

This application is a U.S. national stage application of PCT/EP2015/065132 filed on Jul. 2, 2015, which is based on German Patent Application No. 10 2014 109 285.6 filed on Jul. 2, 2014, the contents of which are incorporated herein by reference.

PRIOR ART

The invention relates to an airplane seat device according to the preamble of patent claim 1.

Airplane seat devices having at least one backrest, having at least one seat component that is coupled to the backrest, and having a backrest impact safety device which by way of partial decoupling of the backrest from the seat component is provided for at least partially reducing impact forces on the backrest in the event of a crash have already been proposed.

The object of the invention lies in particular in providing a device of the generic type having improved properties in terms of safety. The object according to the invention is achieved by the features of patent claim 1, while advantageous design embodiments and refinements of the invention may be derived from the dependent claims.

The invention proceeds from an airplane seat device having at least one backrest, having at least one seat component that is coupled to the backrest, and having a backrest impact safety device which by way of partial decoupling of the backrest from the seat component is provided for at least partially reducing impact forces on the backrest in the event of a crash.

It is proposed that the backrest impact safety device is provided for decoupling the backrest from the seat component prior to the impact forces taking effect. Herein, a "backrest" is to be understood in particular to be a component of an airplane seat on which a person sitting on the airplane seat may support his/her back. Herein, a "seat component" is to be understood in particular to be a component of an airplane seat, such as in particular a seat frame, or part of a fixed structure of the airplane seat, such as a cross tube. In principle it is also conceivable that the seat component is configured as another component that is considered purposeful by a person skilled in the art, in particular as a structural component of an airplane seat. Herein, "coupled" is to be understood as meaning in particular interconnected. It is conceivable herein that two elements that are intercoupled are interconnected directly or indirectly by way of at least one further element. "Partial decoupling" herein is to be understood to mean that a movement of the backrest and a movement of the seat component are mutually separated at least for a defined time and/or along a defined displacement path, such that the backrest may move in relation to the seat component over a defined time and/or along a defined displacement path. "Impact forces" herein are to be understood to be forces which are created by objects, such as in particular by a body of a passenger sitting on the airplane seat, when hitting an element such as in particular the backrest. An "event of a crash" herein is to be understood to be in particular an overload event, that is to say an operating state in which forces that are higher than forces that are created by normal stress in the case of a normal flight operation act on the airplane seat device and/or on the airplane seat of which the airplane seat mounting unit is a part. "Prior to the impact forces taking effect" herein is to be understood in particular as meaning a point in time before the body of a passenger hits the backrest of the airplane seat device. "Provided" is to be understood as meaning specially conceived and/or equipped. An object being provided for a specific function is to be understood in particular as the object fulfilling and/or carrying out this specific function in at least one application and/or operating state. On account thereof, an airplane seat device which in the event of a crash protects a passenger sitting in an airplane seat in a particularly advantageous manner from injury may be advantageously provided. Both the forces acting on the backrest and the forces acting on the body of the passenger are reduced by reducing the impact forces on the backrest, which advantageously reduces the risk of injury.

It is furthermore proposed that the backrest impact safety device has at least one inertia module which is provided for decoupling the backrest impact safety device at least in the event of a crash. Herein, an "inertia module" is to be understood to be in particular a module which by virtue of mass inertia is triggered and released from a locked position. The inertia module herein is preferably formed by an element which by way of the inertia thereof is provided for carrying out an activation. The inertia module herein, by way of the mass inertia thereof, upon deceleration forces, in particular in the event of a crash, acting thereon, is deflected from a locked position. The inertia module herein is preferably released from the locked position axially along a displacement axis. In principle, it is also conceivable that the inertia module is displaced along a displacement line of another configuration, for example on a circular path, if and when the inertia module configures a type of pendulum. Herein, a triggering force which is required for deflecting the inertia module from the locked position thereof may be set by way of the mass of the inertia module. On account thereof, the triggering force may be set in a simple manner for seats of dissimilar size or for seat spacings of dissimilar size in an airplane. In principle, it is also conceivable that the inertia module has at least one electronic acceleration sensor and an electrically and/or electronically actuatable locking mechanism, wherein the locking mechanism is actuated and opened in the case of a defined acceleration that is detected by the at least one acceleration sensor. It is conceivable in principle herein that the locking mechanism is triggered by pyrotechnics or by way of an electromechanical switch.

It is furthermore proposed that the inertia module is provided for locking the backrest impact safety device at least in a normal operating state. A "normal operating state" herein is to be understood in particular to be an operating state during normal operation of the airplane seat device in particular during a state in which the latter is installed in an airplane and during operation of the airplane. "Locking" herein is to be understood in particular to mean keeping in a defined position, in particular in a locked position. On account thereof, the backrest in the normal operating state may be advantageously fixed in relation to the seat component such that normal use of the airplane seat device may be achieved. On account thereof, the backrest impact safety device may be locked in an advantageously simple manner by means of the inertia module.

It is furthermore proposed that the inertia module is provided for being deflected from a locked position for unlocking the backrest impact safety device in the event of a crash. A "locked position" herein is to be understood in particular to be a position of the backrest impact safety device, in which the backrest impact safety device is locked and, in particular, the backrest is fully coupled to the seat component. "Deflected" herein is to be understood in particular to mean moved out of a defined position, wherein this may be an axial movement and/or a pivoting movement. On account thereof, the inertia module may unlock the backrest impact safety device in a particularly advantageous manner.

It is furthermore proposed that the inertia module in the event of a crash is provided for being deflected from a locked position prior to the impact forces taking effect. On account thereof, the backrest impact safety device may be unlocked in a particularly advantageously early manner.

It is moreover proposed that the backrest impact safety device comprises at least one linkage element which is provided for coupling to the seat component. A "linkage element" herein is to be understood in particular to be an element which is provided for connecting two elements, wherein forces may be transmitted between the two connected elements by way of the linkage element. On account thereof, the seat component may be advantageously linked to the backrest impact safety device.

It is furthermore proposed that the backrest impact safety device comprises a housing element in which the inertia module is mounted so as to be axially displaceable. "Mounted so as to be axially displaceable" herein is to be understood in particular to mean that the inertia module is mounted so as to be displaceable in an axial direction. Herein, the axial direction is preferably aligned so as to be parallel with a flight direction. On account thereof, the inertia module may be disposed in the backrest impact safety device in a particularly advantageous manner.

It is furthermore proposed that the backrest impact safety device comprises at least one knuckle joint which in the normal operating state is provided for being coupled to the inertia module. A "knuckle joint" herein is to be understood in particular to be a component which is composed of at least two elements which are interconnected so as to be pivotable about a pivot axis. "Coupled" herein is to be understood in particular to mean interconnected directly or indirectly, that is to say by way of at least one further element. In a state in which the knuckle joint is coupled to the inertia module, a simple transmission of force may be performed by way of the knuckle joint, on account of which the backrest impact safety device may be advantageously configured.

It is furthermore proposed that the knuckle joint is connected to the housing element and to the linkage element in an articulated manner. "Connected" herein is to be understood in particular to mean linked in a rigid or articulated manner by means of a method that is considered purposeful by a person skilled in the art. On account thereof, a force may be advantageously transmitted between the housing element and the linkage element in one position of the knuckle joint.

It is furthermore proposed that the knuckle joint has at least one form-fitting element which in a locked position is provided for being connected to the inertia module in a form-fitting manner. A "form-fitting element" herein is to be understood in particular to be an element which is provided to be connected to another element by way of at least one form fit. On account thereof, the inertia module may be coupled to the knuckle joint in an advantageously simple manner.

It is furthermore proposed that the housing element has at least one guide element in which the linkage element by way of a first end is fastened so as to be axially displaceable. A "guide element" herein is to be understood in particular to be an element which is provided for guiding another element, or is provided for being guided by another element. The guide element herein is preferably configured as a groove. In principle, it is also conceivable that a guide element is configured as a guide rail. On account thereof, the linkage element may be advantageously attached to the backrest impact safety device.

It is moreover proposed that the housing element has at least one guide element by way of which the inertia module is disposed in the housing element so as to be axially displaceable. On account thereof, the inertia module may be advantageously mounted in the housing element for triggering the backrest impact safety device.

It is furthermore proposed that the backrest impact safety device has at least one deceleration element which is provided for absorbing inertia energy of the backrest following a triggering of the backrest impact safety device. A "deceleration element" herein is to be understood in particular to be an element which in at least one operating state is provided for absorbing and/or dissipating energy, so as thus to deprive another system, such as in particular the backrest, of energy. The deceleration element herein is preferably configured as an element which is elongated by way of plastic deformation, and dissipates energy by way of the plastic deformation. The deceleration element herein is preferably formed from a metal, having an undulated shape which in the course of elongation is extended, thus absorbing deformation energy. Herein, a force required for elongating the deceleration element may be set by way of a material thickness, the material, and a shape of the deceleration element. In principle, it is also conceivable for the deceleration element to be configured as a hydraulic or gas jack cylinder, the cylinder plunger of which may be deployed from a housing, counter to the pressure of a gas or of a liquid. In principle, it is likewise conceivable for the deceleration element to be configured as an element which is provided for being destroyed in order for another element to be decelerated, so as to consume energy on account thereof. It is conceivable herein for the deceleration element to be configured as a web which spans a groove and which, in order for an element to be decelerated, is destroyed by a bolt or a pin that is displaced in the groove. In principle, it is also conceivable for the deceleration element to be formed by at least one element such as a groove which has a constricting profile and which, in order to decelerate another element, is widened by a pin element that runs in the groove. On account thereof, an impact force may be set and the backrest may be slowed down in a targeted manner. Furthermore, by modifying the deceleration element, a force at which the knuckle joint may move toward the housing element may advantageously be set.

It is further proposed that the deceleration element is provided at least for setting an impact force. An "impact force" herein is to be understood in particular to be a force at which a test body impacts the backrest in a standardized crash test for an airplane seat. On account thereof, the backrest impact safety device may be adapted in a particularly simple manner to dissimilar seat types or to dissimilar seat spacings in an airplane, simply by modifying the deceleration element.

It is further proposed that the backrest upon partial decoupling is provided for being locked in a locked position again. "Locking" herein is to be understood in particular to mean keeping in a defined position, in particular in a locked position. "Upon partial decoupling" herein is to be understood in particular to mean at a point in time following partial decoupling during the event of a crash. On account thereof, an airplane seat device may advantageously be provided which in the event of a crash protects a passenger sitting in an airplane seat from injury in a particularly advantageous manner, and which, the backrest having been pivoted by the backrest impact safety device during the event of a crash, may be locked in a position again so as to be able to advantageously keep free an escape path. On account thereof, a particularly safe airplane seat may be provided.

It is furthermore proposed that the backrest impact safety device upon partial decoupling is provided for being returned to a locked position. The backrest impact safety device herein is preferably kept in the locked position by way of a form fit. In principle, however, it is also conceivable for the backrest impact safety device to be locked by a magnetic force and/or electrically in the locked position. In principle, it is also conceivable for form-fitting connection in the locked position to be achieved upon partial decoupling during the event of a crash by way of a pyrotechnically triggered plastic deformation. On account thereof, the airplane seat device may advantageously be configured in a particularly advantageous manner and in particular in a minimalistic manner in terms of components.

It is furthermore proposed that the backrest impact safety device has at least one locking module which in a locked position blocks the backrest impact safety device, and in an unlocked position at least partially decouples the latter, wherein the backrest impact safety device is transferable from the unlocked position to the locked position. A "locking module" herein is to be understood in particular to be a module which has at least two force-fitting and/or form-fitting elements which are configured so as to be mutually communicating and which are intercoupled in a locked position, wherein forces may be transmitted between the force-fitting and/or form-fitting elements. In an unlocked position, the force-fitting and/or form-fitting elements of the locking module are at least partially released from one another and may be moved relative to one another at least in a defined region. Herein, preferably no force transmission between the force-fitting and/or form-fitting elements is possible in the unlocked position. On account thereof, locking of the backrest upon partial decoupling may be realized by way of the backrest impact safety device in a particularly simple manner.

It is furthermore proposed that the airplane seat device has at least one additional force element which immediately upon partial decoupling is provided is at least for at least temporarily accelerating the backrest. An "additional force element" herein is to be understood in particular to be an element which in at least an operating state may provide a force by means of which an element such as, in particular, the backrest may be at least temporarily accelerated. The additional force element herein is preferably configured as a spring element which for providing the force is pretensioned, thus providing a spring force. The additional force element herein may be configured as a gas-pressure spring, for example, or as an elastically deformable element such as in particular a helical spring. In principle, it is also conceivable for the additional force element to be configured as a pyrotechnical charge which provides an additional force by way of ignition. On account thereof, the backrest during the event of a crash may be advantageously at least briefly accelerated, so as to minimize a speed differential between a body part of a passenger and the backrest, and so as to thus advantageously reduce impact forces.

The airplane seat device according to the invention herein is not to be limited to the application and embodiment as described above. In particular, the airplane seat device according to the invention, in order to fulfil a functional mode as described herein, may have a number of individual elements, components, and individual parts, that deviates from the number mentioned herein.

DRAWINGS

Further advantages are derived from the following description of the drawings. Nine exemplary embodiments of the invention are illustrated in the drawings. The drawings, the description, and the claims contain numerous features in mutual combination. A person skilled in the art will expediently also consider the features individually and combine the latter so as to form further purposeful combinations.

In the drawings:

FIG. 1 schematically shows a sectional view of an airplane seat device according to the invention, in a first exemplary embodiment having a backrest impact safety device in a locked position;

FIG. 2 schematically shows a sectional view of the backrest impact safety device just upon having been deflected from the locked position;

FIG. 3 schematically shows a sectional view of the backrest impact safety device during the event of a crash;

FIG. 4 schematically shows a sectional view of the backrest impact safety device during the event of a crash;

FIG. 5 schematically shows an illustration of the backrest impact safety device after the event of a crash;

FIG. 6 schematically shows a sectional view of an airplane seat device according to the invention, in a second exemplary embodiment having a backrest impact safety device in a locked position;

FIG. 7 schematically shows a sectional view of the backrest impact safety device in an unlocked position;

FIG. 8 schematically shows a view of a deceleration element of a backrest impact safety device of an airplane seat device in a third exemplary embodiment;

FIG. 9 schematically shows a view of a deceleration element of a backrest impact safety device of an airplane seat device in a fourth exemplary embodiment;

FIG. 10 schematically shows a view of a deceleration element of a backrest impact safety device of an airplane seat device in a fifth exemplary embodiment;

FIG. 11 schematically shows a sectional view of an airplane seat device according to the invention, in a sixth exemplary embodiment having a backrest impact safety device in a locked position;

FIG. 12 schematically shows a sectional view of the backrest impact safety device of the airplane seat device in the sixth exemplary embodiment just upon having been deflected from the locked position;

FIG. 13 schematically shows a sectional view of the backrest impact safety device of the airplane seat device in the sixth exemplary embodiment upon partial unlocking, having a deformed deceleration element;

FIG. 14 schematically shows a sectional view of an airplane seat device according to the invention, in a seventh exemplary embodiment having a backrest impact safety device in a locked position;

FIG. 15 schematically shows a sectional view of the backrest impact safety device of the airplane seat device in the seventh exemplary embodiment just upon having been deflected from the locked position;

FIG. 16 schematically shows a sectional view of the backrest impact safety device of the airplane seat device in the seventh exemplary embodiment upon partial unlocking, having a deformed deceleration element;

Figure 19:
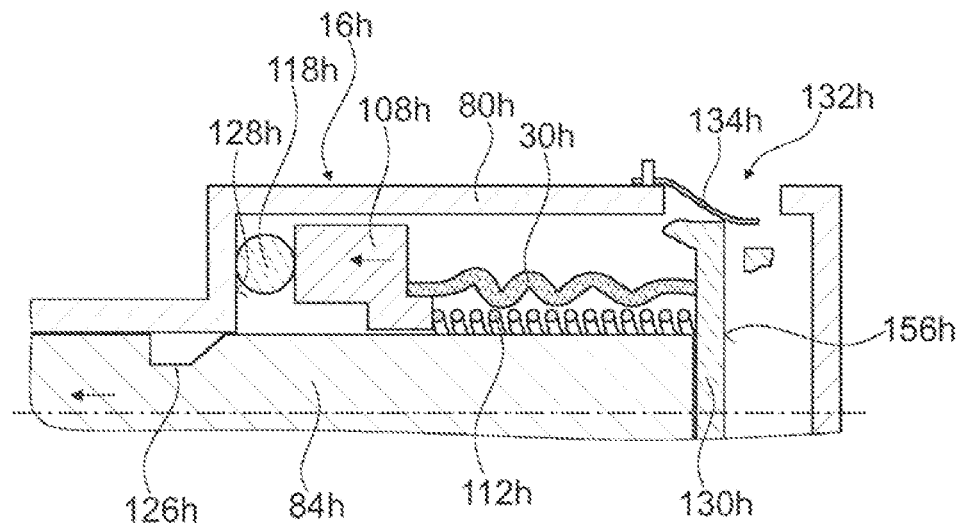
Figure 20:
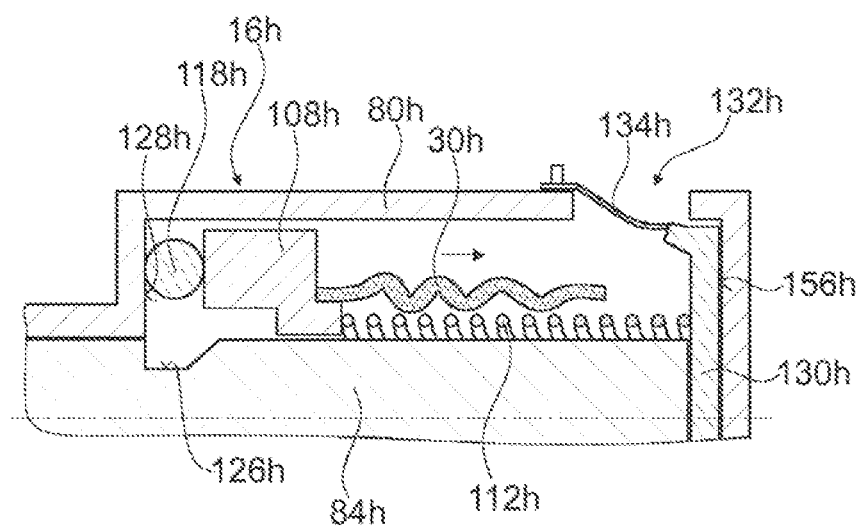
Figure 21:
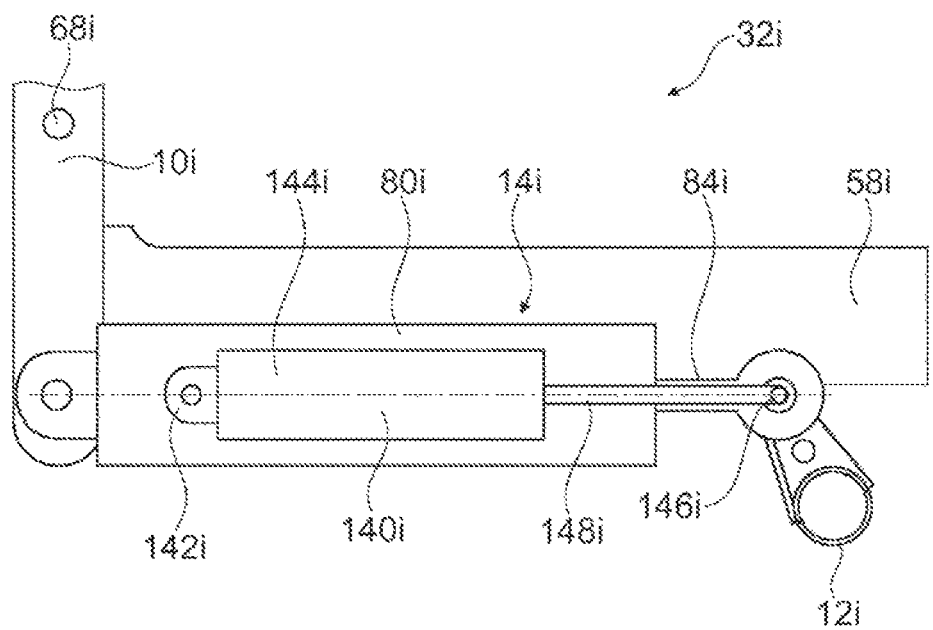

FIG. 19 schematically shows a sectional view of the backrest impact safety device of the airplane seat device in the eighth exemplary embodiment upon partial unlocking, having a deformed deceleration element;

FIG. 20 schematically shows a sectional view of the backrest impact safety device of the airplane seat device in the eighth exemplary embodiment in a locked position, upon partial unlocking; and FIG. 21 schematically shows a view of an airplane seat device according to the invention, in a ninth exemplary embodiment having a backrest impact safety device and an additional force element.

DESCRIPTION OF THE EXEMPLARY EMBODIMENTS

FIGS. 1 to 5 show an airplane seat device according to the invention, in a first exemplary embodiment. The airplane seat device herein is part of a partially illustrated airplane seat 32a. The airplane seat 32a herein is part of an airplane that is not illustrated in more detail. The airplane seat 32a herein, in a fitted state, is mounted in an airplane cabin of the airplane. To this end, the airplane seat 32a has a mounting unit. The airplane seat 32a is mounted on a cabin floor of the airplane cabin by means of the mounting unit. The cabin floor configures a mounting plane for the airplane seat 32a. The airplane seat 32a herein is configured as part of a seat row which comprises more than one airplane seat 32a, preferably at least three airplane seats 32a. The airplane seat 32a herein configures a sitting direction. The sitting direction is defined as that direction in which a passenger sits on the airplane seat 32a. The sitting direction herein is configured so as to be parallel with a flight direction 66a. The flight direction 66a herein is formed by a main extent of the airplane cabin. The mounting unit herein is configured as a common mounting unit of the airplane seats 32a of the airplane seat row. The airplane seat device comprises a backrest 10a. The backrest 10a herein is provided so that a person sitting on the airplane seat 32a, of which the airplane seat device is a part, may support his/her back on the backrest 10a. The backrest 10a is disposed so as to be pivotable in relation to the mounting unit. The backrest 10a herein, by way of a bearing point 68a is pivotably articulated on a seat divider (not illustrated in more detail). The airplane seat device furthermore comprises a seat component 12a. The seat component 12a is configured as a transverse reinforcement unit which is provided for reinforcing the backrest 10a in the transverse direction of the transverse reinforcement unit. Moreover, the seat component 12a, configured as a transverse reinforcement unit, is provided for connecting the one side of the airplane seat 32a, of which the airplane seat device is a part, to the further side of the airplane seat 32a. The seat component 12a, configured as a transverse reinforcement unit, herein extends between the seat dividers (not illustrated in more detail) of the airplane seat 32a. The seat component 12a, configured as a transverse reinforcement unit, is mounted so as to be rotatable in the seat dividers (not illustrated in more detail). The seat component 12a, configured as a transverse reinforcement unit, is provided so as to be rotated in the case of movement of the backrest 10a. The seat component 12a, configured as a transverse reinforcement unit, is configured as a torsion element. In the present exemplary embodiment, the seat component 12a, configured as a transverse reinforcement unit, is configured as a torsion tube. Furthermore, the airplane seat device has a seat base 58a. In principle, it is also conceivable for the seat component 12a to be configured as a seat base or as a component of the seat structure. The seat base 58a configures a seat face. The seat base 58a is coupled to the backrest 10a. Herein, the backrest 10a and the seat base 58a are interconnected in an articulated manner. The backrest 10a and the seat base 58a, by way of kinematics (not illustrated in more detail) of the airplane seat device, are pivotably intercoupled. Herein, the backrest 10a and the seat base 58a are mutually displaceable to various positions, and may be fixed in these various positions. Herein, the backrest 10a and the seat base 58a are preferably mutually displaceable in a stepless manner. In principle, it is also conceivable for the backrest 10a in a normal operating state to be rigidly connected to the seat base 58a or to a seat structure, and for the airplane seat 32a to have only one seat position.

The airplane seat device comprises a backrest impact safety device 14a. The backrest impact safety device 14a is provided for partially decoupling the backrest 10a from the seat component 12a in at least an operating state. Through the partial decoupling of the backrest 10a from the seat component 12a, the backrest 10a and the seat component 12a in the event of a crash may exert a mutual relative movement, so as to reduce the risk of injury for a passenger sitting on the airplane seat 32a. The backrest impact safety device 14a decouples the backrest 10a from the seat component 12a in particular in the event of a crash having a deceleration counter to the flight direction 66a. In the event of a crash, the backrest impact safety device 14a at least partially reduces the impact forces that act on the backrest 10a, on account of which the force acting on a passenger who exerts this force on the backrest 10a is also reduced. The backrest 10a and the seat component 12a, configured as a transverse reinforcement unit, are intercoupled by means of the backrest impact safety device 14a. The backrest impact safety device 14a has a locked position and an unlocked position. In the locked position, the backrest impact safety device 14a is locked, and the backrest 10a is fixedly coupled to the seat component 12a. In the locked position of the backrest impact safety device 14a, the backrest 10a by way of the backrest impact safety device 14a may not move in relation to the seat component 12a. In the unlocked position, the backrest 10a is decoupled from the seat component 12a and may be moved in relation to the seat component 12a. Herein, in the unlocked position of the backrest impact safety device 14a, the backrest 10a in relation to the seat component 12a may be pivoted about an advantageous angle.

The backrest impact safety device 14a decouples the backrest 10a from the seat component 12a prior to the impact forces taking effect on the backrest 10a. On account thereof, the backrest 10a in the event of a crash is decoupled from the seat component 12a before a passenger impacts the backrest 10a and transmits the impact forces to the backrest 10a. On account thereof, the backrest 10a, in the case of an impact of the passenger on the backrest 10a, that is to say when the impact forces take effect, is partially decoupled from the seat component 12a and may thus be moved in relation to the seat component 12a, thus absorbing and/or advantageously redirecting part of the impact forces before or during the impact of the passenger on the backrest 10a, such that an impact on the backrest 10a is less hard for the passenger.

The backrest impact safety device 14a comprises an inertia module 16a. The inertia module 16a is provided for locking the backrest impact safety device 14a in a normal operating state. To this end, the inertia module 16a has a locked position. In the locked position, the inertia module 16a locks the backrest impact safety device 14a in the locked position. In the normal operating state, the backrest impact safety device 14a is blocked in the locked position by means of the inertia module 16a. The backrest impact safety device 14a by way of the inertia module 16a is locked in the normal operating state, on account of which the backrest 10a and the seat component 12a by way of the backrest impact safety device 14a are fixedly intercoupled. In the event of a crash, the inertia module 16a for unlocking the backrest impact safety device 14a is provided for being deflected from the locked position of the former. The inertia module 16a herein is provided for being deflected from a locked position prior to the impact forces taking effect. If and when the inertia module 16a has been deflected from the locked position thereof, the former releases the backrest impact safety device 14a, the latter reaching the unlocked position from the locked position. To this end, the inertia module 16a configures a mass body. The mass body is provided for imparting mass to the inertia module 16a, which mass by way of the mass inertia thereof, in the event of a crash, deflects the inertia module 16a in the backrest impact safety device 14a from the locked position of the former.

The backrest impact safety device 14a comprises a housing element 20a. The housing element 20a is provided for encapsulating the backrest impact safety device 14a. The housing element 20a is configured as a bent metal part. In principle, it is also conceivable for the housing element 20a to be configured in another manner which is considered purposeful by a person skilled in the art, for example as a milled part or a casting. The housing element 20a has a substantially U-shaped cross section. The housing element 20a herein configures two lateral regions which laterally delimit the housing element 20a, and a central region which interconnects the two lateral regions on an upper side. The housing element 20a is opened on a lower side. The housing element 20a is likewise opened on an axial front side and on an axial rear side. The housing element 20a, by way of the lateral regions thereof and the central region thereof, defines an interior space 56a. The inertia module 16a is mounted in the housing element 20a so as to be axially displaceable. The inertia module 16a herein is disposed in the interior space 56a that is defined by the housing element 20a. To this end, the housing element 20a has two guide elements 28a and two guide elements 50a. The guide elements 28a and the guide elements 50a are configured as guide grooves. Herein, in each case one guide element 28a and one guide element 50a, configured as a guide groove, are incorporated into a lateral region of the housing element 20a. The guide elements 28a, 50a herein are configured as passage grooves. The guide elements 28a on the opposite lateral regions of the housing element 20a herein each are configured in a mutually equivalent manner. The guide elements 50a on the opposite lateral regions of the housing element 20a herein each are configured in a mutually equivalent manner. Herein, the guide elements 28a are disposed in a forward region of the housing element 20a, mounting a forward region of the inertia module 16a. The guide elements 50a are disposed in a rearward region of the housing element 20a, mounting a rearward region of the inertia module 16a. In order for the inertia module 16a to be mounted in the guide elements 28a and in the guide elements 50a, the backrest impact safety device 14a comprises a first pin element 52a and a second pin element 54a. The pin elements 52a, 54a herein, in a fitted state, are disposed in receptacles (not illustrated in more detail) of the inertia module 16a. Herein, the first pin element 52a in the fitted state engages in the guide elements 28a in the forward region of the housing element 20a. The second pin element 54a in the fitted state engages in the guide elements 50a in the rearward region of the housing element 20a. The inertia module 16a, by way of the two pin elements 52a, 54a, may be displaced in relation to the housing element 20a in the axial direction. The inertia module 16a, by way of the linkage of the inertia module 16a by way of the two pin elements 52a, 54a, is positioned in a defined position in relation to the housing element 20a. The guide elements 28a, 50a run so as to be mutually aligned, on account of which the inertia module 16a, in the case of a displacement by way of the pin elements 52a, 54a, is displaced parallel with the housing element 20a. The guide elements 28a, 50a in the fitted state run substantially horizontally to the mounting plane and in the flight direction 66a. The housing element 20a, on the axial rear side, configures a receptacle 38a. The backrest 10a, by way of the receptacle 38a, is linked to the housing element 20a. In a fitted state, the receptacle 38a links the backrest impact safety device 14a to the backrest 10a. Herein, the backrest impact safety device 14a, by way of the receptacle 38a, is linked to the backrest 10a in a region below the bearing point 68a by way of which the backrest 10a is pivotably mounted. The receptacle 38a is configured by two through bores which are incorporated into the two lateral regions of the housing element 20a and which are configured and positioned so as to be mutually equivalent. The backrest 10a herein is connected to the backrest 10a by way of a connection element such as a screw, for example.

The backrest impact safety device 14a comprises a linkage element 18a. The linkage element 18a is provided for coupling to the seat base 58a. The linkage element 18a links the backrest impact safety device 14a to the seat base 58a. The linkage element 18a herein is mounted on the seat component 12a, configured as a transverse reinforcement unit. The linkage element 18a, by way of a first end, is connected to the seat component 12a, configured as a transverse reinforcement unit. The linkage element 18a herein is connected to the seat component 12a, configured as a transverse reinforcement unit, by way of a welded connection. The linkage element 18a, at a second end, is connected to the backrest impact safety device 14a. To this end, the backrest impact safety device 14a has two guide elements 26a. The guide elements 26a are configured as guide grooves. Herein, in each case one guide element 26a, configured as a guide groove, is incorporated into a lateral region of the housing element 20a. The guide elements 26a herein are configured as passage grooves. The guide elements 26a on the opposite lateral regions of the housing element 20a herein each are configured in a mutually equivalent manner. Herein, the guide elements 26a are disposed in a forward region of the housing element 20a. The guide elements 26a herein have an axial length by which the linkage element 18a may be axially displaced in relation to the housing element 20a. Herein, an angle about which the backrest 10a is pivotable in the event of a crash is defined by a length of the guide elements 26a. The longer the guide elements 26a, the larger an angle about which the backrest 10a may be pivoted in the event of a crash. The backrest impact safety device 14a comprises a bolt 36a which by way of the guide elements 26a links the linkage element 18a to the backrest impact safety device 14a. The bolt 36a herein is mounted in the guide elements 26a. The linkage element 18a, which by way of an upper region extends into the interior space 56a which is defined by the housing element 20a, is axially displaceable in the guide elements 26a of the housing element 20a by way of the bolt 36a. The seat base 58a is likewise linked to the linkage element 18a, and on account thereof to the backrest impact safety device 14a, by way of the bolt 36a.

The backrest safety impact device 14a comprises a knuckle joint 22a. The knuckle joint 22a in the normal operating state is provided for being coupled to the inertia module 16a. The knuckle joint 22a is coupled to the housing element 20a and to the linkage element 18a. The knuckle joint 22a herein is disposed in the interior space 56a that is defined by the housing element 20a. The knuckle joint 22a herein is disposed below the inertia module 16a, that is to say on a side that faces away from the central region of the housing element 20a. The knuckle joint 22a has a first hinged bracket 40a and a second hinged bracket 42a. The hinged brackets 40a, 42a are pivotably intercoupled by way of a pin element 44a. The hinged brackets 40a, 42a are mutually pivotable in relation to a pivot axis that is formed by the pin element 44a. The first hinged bracket 40a is disposed in a forward region of the backrest impact safety device 14a in the housing element 20a. The first hinged bracket 40a is coupled to the housing element 20a in an articulated manner. The first hinged bracket 40a is linked to the housing element 20a on the axial front side of the housing element 20a. To this end, the backrest impact safety device 14a has a bearing element 46a which is linked in a receptacle of the housing element 20a. The bearing element 46a herein is configured as a pin element. The second hinged bracket 42a which is coupled to the first hinged bracket 40a is linked to the linkage element 18a by way of the bolt 36a. The second hinged bracket 42a, by way of the end thereof that is connected to the bolt 36a, configures an axially displaceable end of the knuckle joint 22a.

In order to be linked to the inertia module 16a, the knuckle joint 22a has a form-fitting element 24a. The form-fitting element 24a is configured as a hook. In the locked position of the backrest impact safety device 14a the form-fitting element 24a is connected to the inertia module 16a. The form-fitting element 24a is configured by the first hinged bracket 40a. The form-fitting element 24a is disposed on an upper side of the hinged bracket 40a. The form-fitting element 24a herein is disposed on an end of the hinged bracket 40a on which the first hinged bracket 40a is coupled to the second hinged bracket 42a. The form-fitting element 24a, configured as a hook, herein is opened axially in the direction of the forward end of the first hinged bracket 40a that is connected to the housing element 20a. In order to be coupled to the inertia module 16a, the inertia module 16a likewise has a form-fitting element 48a. The form-fitting element 48a is formed by the pin element 52a by way of which the inertia module 16a is mounted in the guide elements 50a of the housing element 20a.

The knuckle joint 22a has a locked position which the knuckle joint 22a assumes in the locked position of the backrest impact safety device 14a. In the locked position of the knuckle joint 22a, the hinged brackets 40a, 42a are disposed so as to be mutually aligned. In the locked position of the knuckle joint 22a, the hinged brackets 40a, 42a, and the bearing element 46a, the bolt 36a, and the pin element 44a are disposed in alignment. The form-fitting element 24a herein, in the locked position of the knuckle joint 22a, is coupled to the form-fitting element 48a of the inertia module 16a in a form-fitting manner. Herein, the hinged brackets 40a, 42a of the knuckle joint 22a are aligned so as to be parallel with the guide elements 26a. The bolt 36a, which by way of the guide elements 26a is mounted so as to be axially displaceable, herein, in the locked position of the knuckle joint 22a, is secured in the locked position thereof at a rearward end of the guide elements 26a. The bolt 36a in the locked position of the knuckle joint 22a may be supported on the housing element 20a by way of the two hinged brackets 40a, 42a. A force acting parallel with the guide elements 26a on the bolt 36a is introduced into the housing element 20a by way of the second hinged bracket 42a, the pin element 44a, the first hinged bracket 40a, and the bearing element 46a.

The backrest impact safety device 14a comprises a deflection unit 34a which is provided for deflecting the knuckle joint 22a from the locked position in the event of a crash. The deflection unit 34a herein is provided for moving the knuckle joint 22a from the locked position in the case of an axial displacement of the inertia module 16a. The deflection unit 34a herein is provided for pushing at least one of the hinged brackets 40a, 42a of the knuckle joint 22a downward, away from the inertia module 16a. The deflection unit 34a has an activation elevation 60a. The activation elevation 60a is formed by the second hinged bracket 42a. The activation elevation 60a herein is disposed on an upper side of the second hinged bracket 42a. The activation elevation 60a, in a locked position of the backrest impact safety device 14a, is disposed in a clearance 62a in a lower side of the inertia module 16a. The deflection unit 34a comprises an activation face 64a. The activation face 64a is formed by the lower side of the inertia module 16a, and adjoins the clearance 62a in which the activation elevation 60a is disposed in the locked position. The activation face 64a is configured so as to be oblique, and extends from a floor of the clearance 62a to a lower region of the inertia module 16a. The activation face 64a herein faces the forward region of the housing element 20a. If and when the inertia module 16a is deflected from the locked position thereof, the oblique activation face 64a contacts the activation elevation 60a which is formed by the second hinged bracket 42a, pushing the latter away downward such that the hinged brackets 40a, 42a are pushed out of mutual alignment (cf. FIG. 2). On account thereof, the hinged brackets 40a, 42a by way of the pin element 44a may be mutually pivoted, and the bolt 36a may thus be axially displaced in the guide elements 26a. In the event of a crash, the knuckle joint 22a is displaced from the locked position thereof to an unlocked position by way of the deflection unit 34a.

The backrest impact safety device 14a comprises a deceleration element 30a. The deceleration element 30a is provided for setting a triggering force for the backrest impact safety device 14a. In the event of a crash, the deceleration element 30a absorbs at least a part of inertia forces which act on the backrest 10a. The deceleration element 30a by way of a first end is fixedly connected to the housing element 20a. A second end of the deceleration element 30a is fixedly connected to the axially displaceable end of the knuckle joint 22a. The deceleration element 30a, by way of the second end thereof and by way of the bolt 36a, is fixedly connected to the second hinged bracket 42a of the knuckle joint 22a, and on account thereof also to the linkage element 18a. On account thereof, the deceleration element 30a connects the housing element 20a to the axially displaceable end of the knuckle joint 22a. The deceleration element 30a is configured as a metal strip which in a central region is configured in an undulated manner. In the case of a force acting on the deceleration element 30a in an axial direction, that is to say in the main direction of extent of the deceleration element 30a, the deceleration element 30a is elongated and deformed. In the case of the deformation procedure, the undulated central region of the deceleration element 30a, configured as a metal strip, is longitudinally drawn, an undulated shape of the central region being reduced. Herein, by the deformation of the deceleration element 30a, the inertia forces that act on the backrest 10a are converted to deformation energy and, on account thereof, dissipated. The deceleration element 30a at each end thereof has a receptacle, by way of which the deceleration element 30a linked in each case to the housing element 20a or to the bolt 36a, respectively. Herein, the deceleration element 30a holds the bolt 36a and, on account thereof the axially movable end of the knuckle joint 22a, in a defined position in relation to the housing element 20a, up to a specific force. The deceleration element 30a has an initial position, the deceleration element 30a having the latter in the normal operating state. The deceleration element 30a is not elongated in the initial position. The deceleration element 30a herein is fastened to the hinged bracket 42a of the knuckle joint 22a by way of the bolt 36a. In the event of a crash, the deceleration element 30a serves for reducing force and herein in particular for a defined impact of the passenger on the backrest 10a. In principle, it is also conceivable for the deceleration element 30a to have another shape which is deformed in the case of a force taking effect. In principle, it is likewise conceivable for the deceleration element 30a to be configured as a hydraulic cylinder or a gas jack cylinder.

Figure 1:
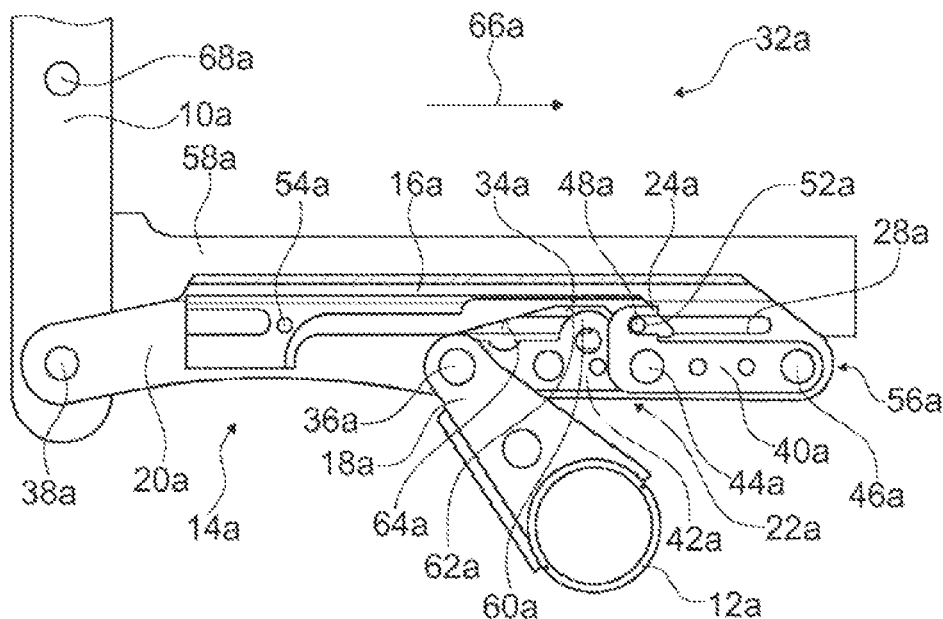
Figure 2:
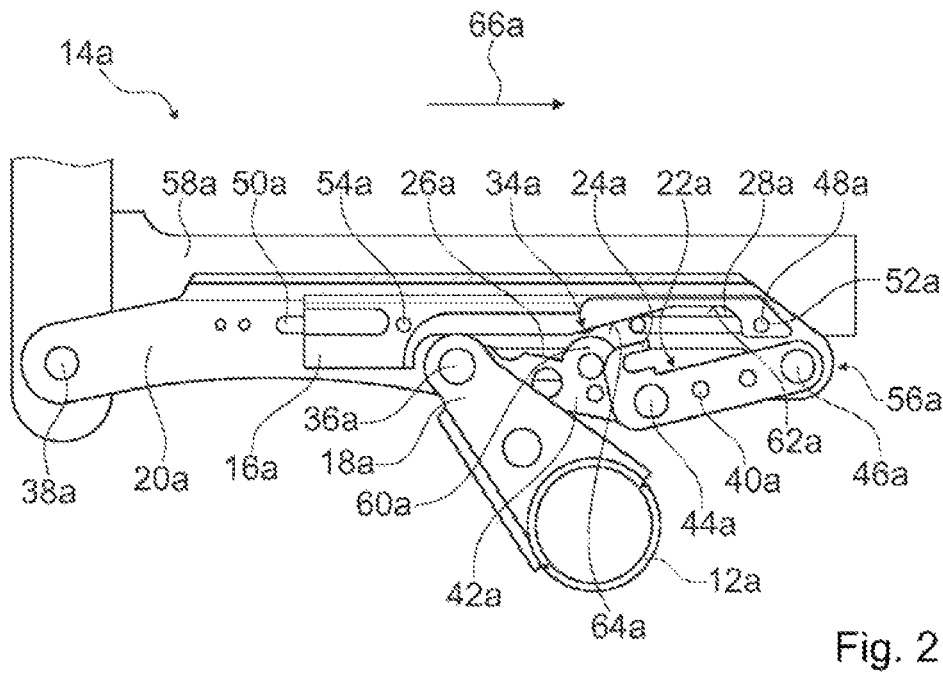

A reaction of the airplane seat device having the backrest impact safety device 14a in the event of a crash is to be briefly described hereunder. FIG. 1 schematically shows the airplane seat device having the backrest impact safety device 14a in the locked position thereof. The inertia module 16a is in the locked position thereof at a rearward end of the respective guide elements 28a, 50a, and the form-fitting element 24a of the knuckle joint 22a engages in the form-fitting element 48a of the inertia module 16a, on account of which the knuckle joint 22a is likewise kept in the locked position thereof. The hinged brackets 40a, 42a are mutually aligned, holding the bolt 36a in the locked position thereof at the rearward end of the guide elements 26a. The seat component 12a is rigidly coupled to the backrest 10a by way of the backrest impact safety device 14a. If and when, in the event of a crash, a deceleration arises counter to the flight direction 66a, the backrest impact safety device 14a being aligned parallel with the latter, the housing element 20a which is coupled to the mounting unit is decelerated, and the inertia module 16a which is axially mounted in the housing element 20a, by way of the inertia of said inertia module 16a, is deflected from the locked position thereof and displaced in the direction of the forward end of the housing element 20a. On account thereof, the form-fitting element 48a of the inertia module 16a is initially released from the form-fitting element 24a of the knuckle joint 22a, on account of which the knuckle joint 22a is decoupled from the inertia module 16a. The knuckle joint 22a is downwardly deflected by way of the deflection unit 34a, and the hinged brackets 40a, 42a are thus deflected from mutual alignment. Herein, the inertia module 16a by way of the activation face 64a travels across the activation elevation 60a, thus deflecting the second hinged bracket 42a downward. On account thereof, the bolt 36a in the guide elements 26a is released, and the bolt 36a conjointly with the linkage element 18a may move in the axial direction in the guide elements 26a (cf. FIG. 2). The backrest 10a is now at least partially decoupled form the seat component 12a.

Figure 3:
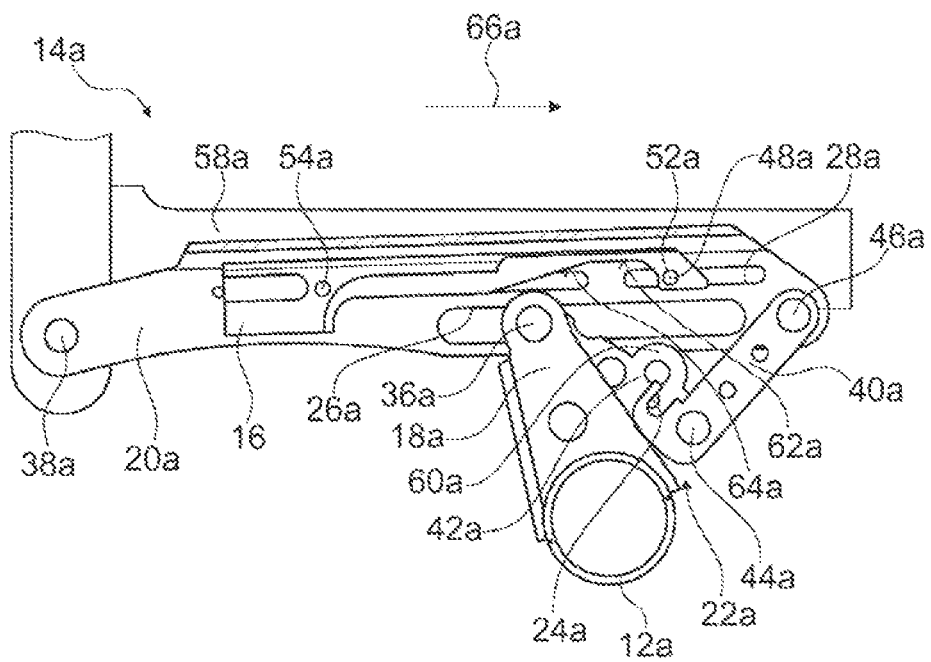
Figure 4:
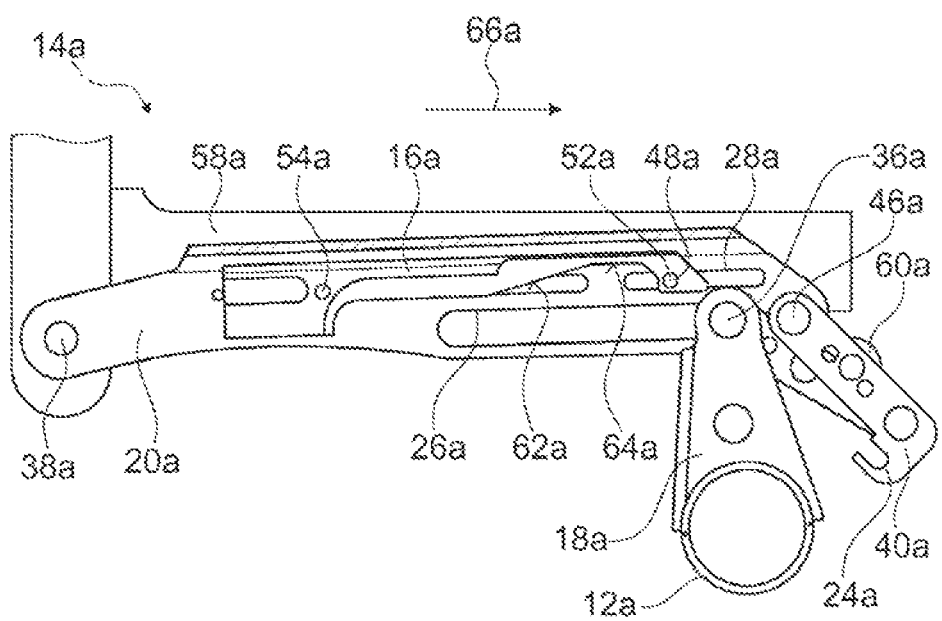
Figure 5:
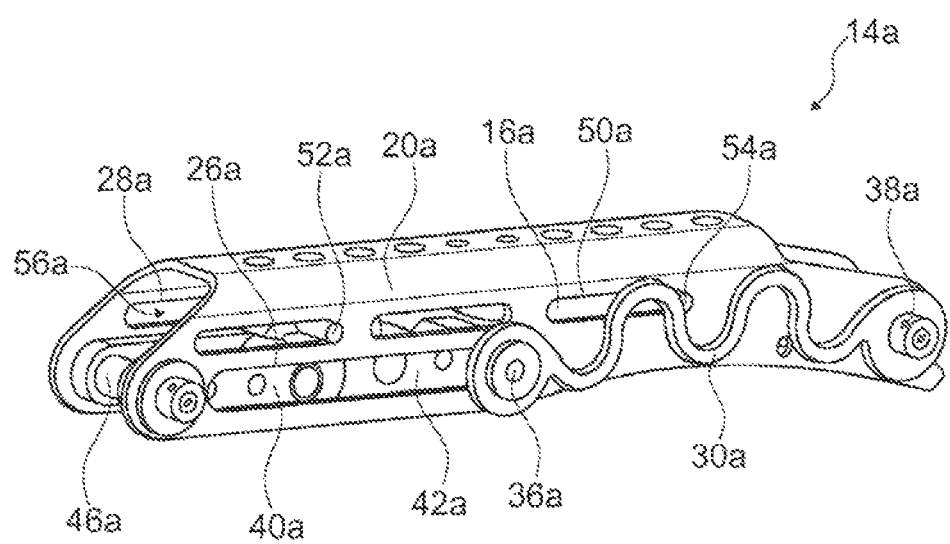

By way of the partial decoupling of the backrest 10a from the seat component 12a, the backrest 10a may rotate about the bearing point 68a by means of which the backrest 10a is pivotably mounted. Herein, by virtue of mass inertia, a major part of the backrest 10a is accelerated in the direction of the flight direction 66a in the event of a crash. The major part of the backrest 10a moves in the direction of the flight direction 66a in the event of a crash. By virtue of mass inertia, and by virtue of the pivotable mounting of the backrest 10a about the bearing point 68a, a lower region of the backrest 10a moves counter to the flight direction 66a. A momentum, which pushes an upper end of the backrest 10a to the front, is introduced into the backrest 10a around the bearing point 68a by the inertia of the backrest 10a. A lower end, at which the backrest impact safety device 14a is linked to the backrest 10a, is moved counter to the flight direction 66a. Herein, the housing element 20a, by way of the coupling to the lower end of the backrest 10a, is drawn backward, counter to the flight direction 66a. Herein, the bolt 36a is displaced in the guide elements 26a. The knuckle joint 22a herein is already in the unlocked position thereof, and the hinged brackets 40a, 42a may be mutually freely pivoted by way of the pin element 44a, not putting up any force countering the movement of the bolt 36a in the guide elements 26a. The seat base 58a herein is likewise moved counter to the flight direction 66a. The movement of the backrest 10a and thus also a movement of the seat base 58a counter to the flight direction 66a is slowed down by the deceleration element 30a which counteracts the movement of the housing element 20a. Herein, a position of the backrest impact safety device 14a during the event of a crash is shown in FIG. 3. FIG. 4 shows a maximum displacement of the housing element 20a in relation to the bolt 36a and to the linkage element 18a.

Eight further exemplary embodiments of the invention are shown in FIGS. 6 to 21. The descriptions and drawings hereunder are substantially limited to the respective points of difference between the exemplary embodiments, wherein in terms of identically referenced components, in particular in terms of components having identical reference signs, reference may also be made in principle to the drawings and/or to the description of the other exemplary embodiment of FIGS. 1 to 5. For differentiation of the exemplary embodiments, the suffix a is added to the reference signs of the exemplary embodiment in FIGS. 1 to 5. The suffix a is replaced with the suffixes b to i in the exemplary embodiments of FIGS. 6 to 21.

Figure 6:
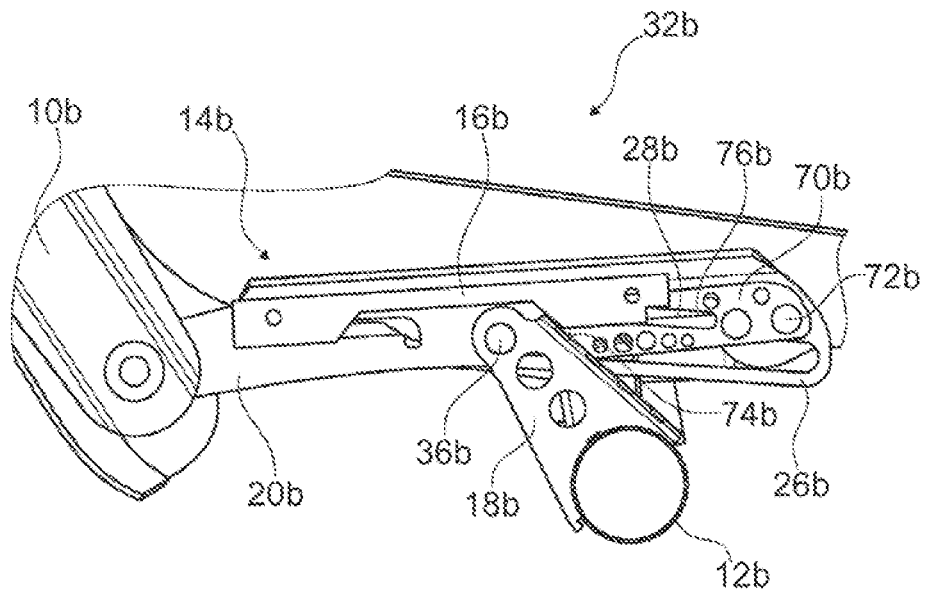
Figure 7:
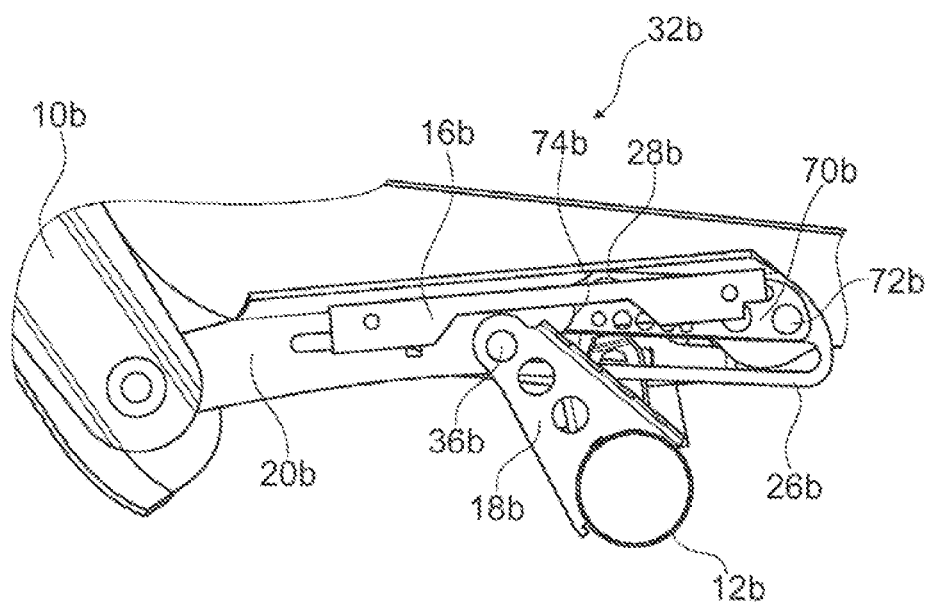

FIGS. 6 and 7 show an airplane seat device according to the invention in a second exemplary embodiment. The airplane seat device herein is part of a partially illustrated airplane seat 32b. The airplane seat device comprises a backrest 10b. The backrest 10b herein is provided so that a person sitting on the airplane seat 32b, the airplane seat device being part thereof, may support his/her back on the backrest 10b. The airplane seat device furthermore comprises a seat component 12b. The airplane seat device comprises a backrest impact safety device 14b. The backrest impact safety device 14b is provided for decoupling the backrest 10b from the seat component 12b in at least an operating state. The backrest impact safety device 14b comprises an inertia module 16b and a housing element 20b in which the inertia module 16b is mounted so as to be axially displaceable. Herein, the inertia module 16b, like the inertia module of the first exemplary embodiment, is provided for being deflected from a locked position in the event of a crash. The housing element 20b is of substantially identical construction as the housing element of the first exemplary embodiment. The backrest impact safety device 14b comprises a linkage element 18b. The linkage element 18b is provided for coupling to the seat component 12b. The linkage element 18b links the backrest impact safety device 14b to the seat component 12b. The linkage element 18b is connected to the backrest impact safety device 14b. To this end, the backrest impact safety device 14b has two guide elements 26b. The guide elements 26b are configured as guide grooves. The backrest impact safety device 14b comprises a bolt 36b which by way of the guide elements 26b links the linkage element 18b to the backrest impact safety device 14b. The bolt 36b herein is mounted in the guide elements 26b.

By contrast to the first exemplary embodiment, the backrest impact safety device 14b has a blocking element 70b. The blocking element 70b by way of a pin element 72b is pivotably mounted in a forward region of the housing element 20b. The blocking element 70b has a locked position (FIG. 6). In the locked position, the blocking element 70b by way of a form-fitting element 74b blocks the bolt 36b in the locked position thereof. The form-fitting element 74b herein is disposed on a forward free end of the blocking element 70b. The blocking element 70b has a guide element 76b. The guide element 76b is configured as a groove. The guide element 76b of the blocking element 70b is coupled to a pin element (not illustrated in more detail) of the inertia module 16b. The guide element 76b of the blocking element 70b herein is obliquely aligned in relation to guide elements 28b by way of which the inertia module 16b is mounted in the housing element 20b. In the case of an axial displacement of the inertia module 16b in relation to the housing element 20b in the guide elements 28b, the pin element of the inertia module 16b is displaced in the guide element 76b of the blocking element 70b. On account thereof, the blocking element 70b by way of the forward free end is pivoted in relation to the housing element 20b. On account thereof, the blocking element 70b releases the bolt 36b, and the latter may be displaced in the guide elements 26b in which the bolt 36b is displaceably mounted. A further reaction of the airplane seat device, and in particular of the backrest impact safety device 14b, in the event of a crash herein takes place in a manner substantially identical to that of the first exemplary embodiment.

Figure 8:
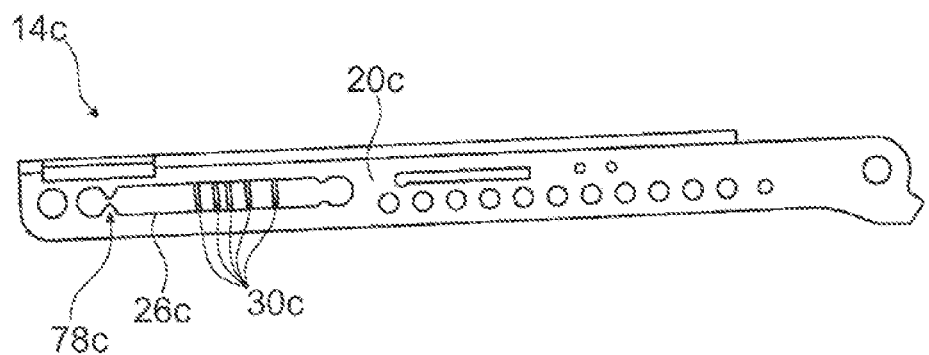

FIG. 8 shows part of an airplane seat device according to the invention in a third exemplary embodiment. The airplane seat device comprises a backrest impact safety device 14c. The backrest impact safety device 14c is provided for partially decoupling a backrest from a seat component in at least an operating state. FIG. 8 herein shows only a housing element 20c of the backrest impact safety device 14c in a sectional view. The backrest impact safety device 14c comprises a plurality of deceleration elements 30c. By contrast to the other exemplary embodiments, only the deceleration elements 30c differ from the deceleration elements of the other exemplary embodiments. The deceleration elements 30c each are configured as a web which spans a guide element 26c that is configured as a groove. The deceleration elements 30c, configured as a web, extend transversely to a main direction of extent of the guide element 26c, connecting one side of the guide element 26c, configured as a grove, to an opposite side of the guide element 26c. The deceleration elements 30c each are disposed so as to be mutually spaced apart. A bolt (not illustrated in more detail) which is mounted so as to be axially displaceable in the guide element 26c and which couples the housing element 20c to the seat component, in order to be displaced in the guide element 26c has to destroy the deceleration elements 30c, on account of which energy is dissipated and the bolt and thus the backrest which is coupled thereto are decelerated by the deceleration elements 30c. It is conceivable herein for the plurality of deceleration elements 30c to have dissimilar resistances to destruction and for a defined dissipation of energy, that is to say a defined deceleration, thus to be able to be reached. In order for the bolt (not illustrated in more detail) to be secured in a resting position, the backrest impact safety device 14c has two retaining elements 78c which are disposed at a first end of the guide element 26c that is configured as a groove. The retaining elements 78c herein are configured as hooks which inwardly protrude into the guide element 26c that is configured as a groove. In order to be displaced in the guide element 26c that is configured as a groove, the bolt has to first destroy the retaining elements 78c.

Figure 9:
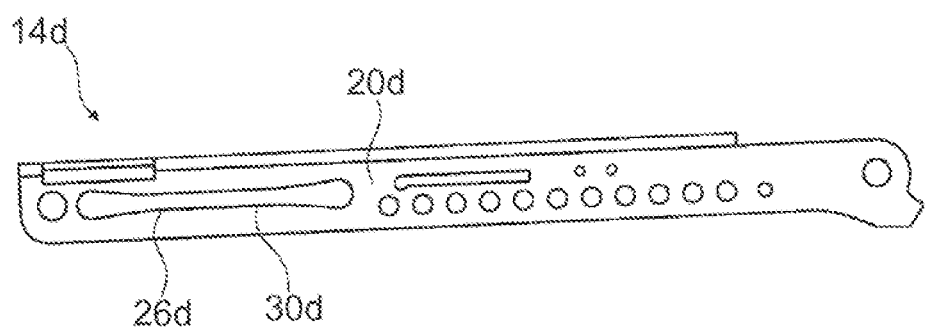

FIG. 9 shows part of an airplane seat device according to the invention in a fourth exemplary embodiment. The airplane seat device comprises a backrest impact safety device 14d. The backrest impact safety device 14d is provided for partially decoupling a backrest from a seat component in at least an operating state. FIG. 9 herein shows only a housing element 20d of the backrest impact safety device 14d in a sectional view. The backrest impact safety device 14d comprises a deceleration element 30d. By contrast to the other exemplary embodiments, only the deceleration element 30d differs from the deceleration elements of the other exemplary embodiments. The deceleration element 30d herein is configured so as to be integral to a guide element 26d that is configured as a groove, in that a bolt for linking a seat component that is configured as a transverse reinforcement unit is mounted so as to be axially displaceable. The guide element 26d herein that configures the deceleration element 30c is configured so as to taper off. The guide element 26d in a direction in which the bolt is displaced in the event of a crash has a tapering, wherein the guide element 26d herein has a width which is smaller than a width of the bolt. The bolt herein, for axial displacement in the guide element 26d, has to widen the guide element 26d that integrally configures the deceleration element 30d. Energy is dissipated by the plastic deformation of the guide element 26d which configures the deceleration element 30d, and the bolt is thereby decelerated.

Figure 10:
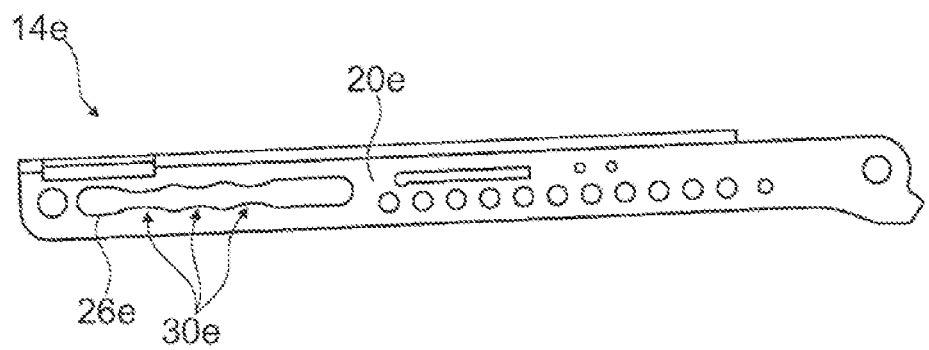

FIG. 10 shows part of an airplane seat device according to the invention in a fifth exemplary embodiment. The airplane seat device comprises a backrest impact safety device 14e. The backrest impact safety device 14e is provided for partially decoupling a backrest from a seat component in at least an operating state. FIG. 10 herein shows only a housing elements 20e of the backrest impact safety device 14e in a sectional view. The backrest impact safety device 14e comprises a plurality of deceleration elements 30e. Herein, only the deceleration elements 30e differ from the deceleration elements of the other exemplary embodiments. The deceleration elements 30e are configured as taperings of a guide element 26e that is configured as a groove. In the region of the deceleration elements 30e, lateral edges of the guide element 26e that is configured as a groove each extend inward, so as to converge. On account thereof, the guide element 26e that is configured as a groove is in each case constricted in the region of the deceleration elements 30e. A bolt which is movably mounted in the guide element 26e, in order to be able to be displaced in the guide element 26e that is configured as a groove, must bend open the deceleration elements 30e which are configured as taperings, on account of which kinetic energy may be dissipated to form deformation energy.

Figure 11:
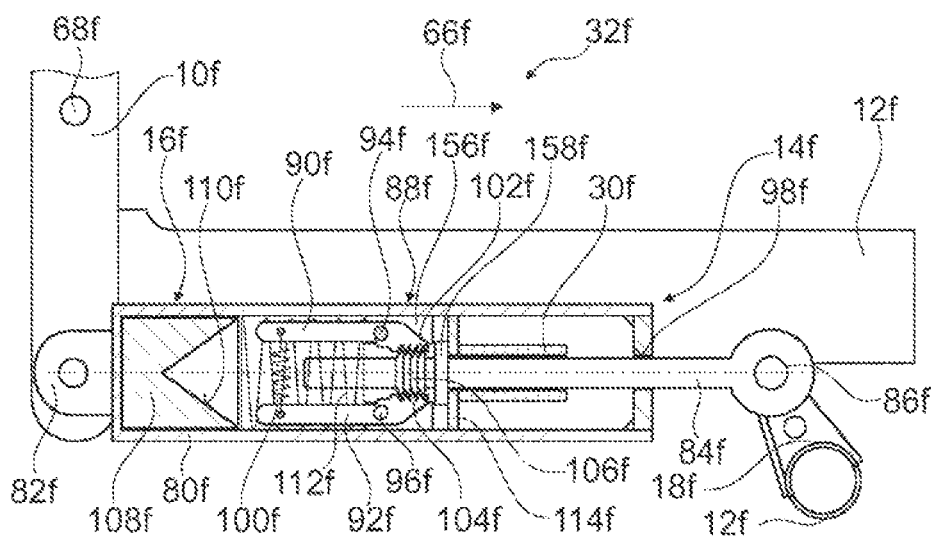
Figure 12:
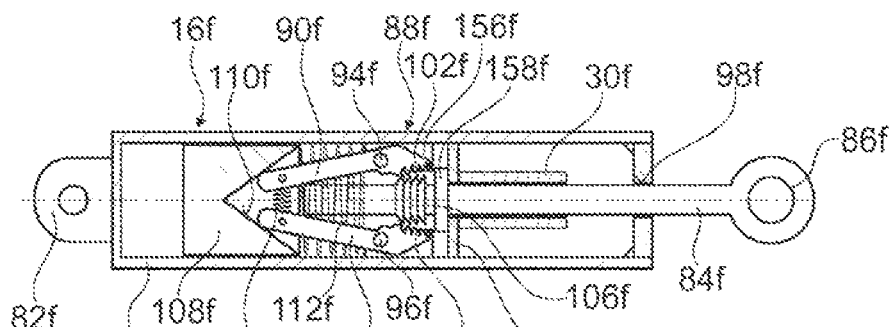
Figure 13:
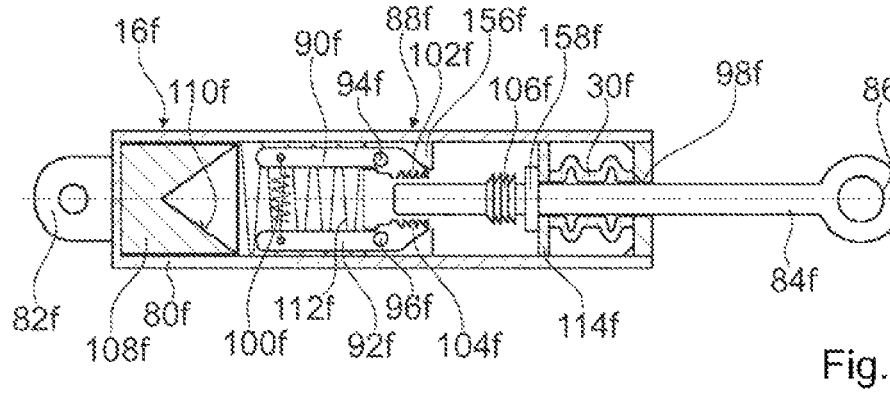

FIGS. 11 to 13 show an airplane seat device according to the invention in a sixth exemplary embodiment. The airplane seat device herein is part of a partially illustrated airplane seat 32f. The airplane seat 32f herein is part of an airplane (not illustrated in more detail). The airplane seat 32f herein, in a fitted state, is mounted in an airplane cabin of the airplane. To this end, the airplane seat 32f has a mounting unit. The airplane seat 32f is mounted on a cabin floor of the airplane cabin by means of the mounting unit. The cabin floor configures a mounting plane for the airplane seat 32f. The airplane seat 32f herein is configured as part of a seat row which comprises more than one airplane seat 32f, preferably at least three airplane seats 32f. The airplane seat 32f herein configures a sitting direction. The sitting direction is defined as that direction in which a passenger sits on the airplane seat 32f. The sitting direction herein is configured so as to be parallel with a flight direction 66f. The flight direction 66f herein is formed by a main extent of the airplane cabin. The mounting unit herein is configured as a common mounting unit of the airplane seats 32f of the airplane seat row. The airplane seat device comprises a backrest 10f. The backrest 10f herein is provided so that a person sitting on the airplane seat 32f, of which the airplane seat device is a part, may support his/her back on the backrest 10f. The backrest 10f is disposed so as to be pivotable in relation to the mounting unit. The backrest 10f herein, by way of a bearing point 68f is pivotably articulated on a seat divider (not illustrated in more detail). The airplane seat device furthermore comprises a seat component 12f. The seat component 12f is configured as a transverse reinforcement unit which is provided for reinforcing the backrest 10f in the transverse direction of the transverse reinforcement unit. Moreover, the seat component 12f, configured as a transverse reinforcement unit, is provided for connecting the one side of the airplane seat 32f, of which the airplane seat device is a part, to the further side of the airplane seat 32f. The seat component 12f, configured as a transverse reinforcement unit, herein extends between the seat dividers (not illustrated in more detail) of the airplane seat 32f. The seat component 12f, configured as a transverse reinforcement unit, is mounted so as to be rotatable in the seat dividers (not illustrated in more detail). The seat component 12f, configured as a transverse reinforcement unit, is provided so as to be rotated in the case of movement of the backrest 10f. The seat component 12f, configured as a transverse reinforcement unit, is configured as a torsion element. In the present exemplary embodiment, the seat component 12f, configured as a transverse reinforcement unit, is configured as a torsion tube. Furthermore, the airplane seat device has a seat base 58f. In principle, it is also conceivable for the seat component 12f to be configured as a seat base or as a component of the seat structure. The seat base 58f configures a seat face. The seat base 58f is coupled to the backrest 10f. Herein, the backrest 10f and the seat base 58f are interconnected in an articulated manner. The backrest 10f and the seat base 58f, by way of kinematics (not illustrated in more detail) of the airplane seat device, are pivotably intercoupled. Herein, the backrest 10f and the seat base 58f are mutually displaceable to various positions, and may be fixed in these various positions. Herein, the backrest 10f and the seat base 58f are preferably mutually displaceable in a stepless manner. In principle, it is also conceivable for the backrest 10f in a normal operating state to be rigidly connected to the seat base 58f or to a seat structure, and for the airplane seat 32f to have only one seat position.

The airplane seat device comprises a backrest impact safety device 14f. The backrest impact safety device 14f, at least in a normal operating state, is provided for rigidly connecting the backrest 10f to the seat component 12f in a locked position. In the normal operating state which reflects a normal and orderly use of the airplane seat 32f, forces may be transmitted from the backrest 10f to the seat component 12f by way of the backrest impact safety device 14f. In the normal operating state in which the backrest impact safety device 14f rigidly connects the backrest 10f to the seat component 12f in the locked position, forces may be transmitted in a forward manner, that is to say in the flight direction 66, and counter to the flight direction 66. The backrest impact safety device 14f is provided for partially decoupling the backrest 10f from the seat component 12f in at least an operating state. Through the partial decoupling of the backrest 10f from the seat component 12f, the backrest 10f and the seat component 12f in the event of a crash may exert a mutually relative movement, so as to reduce the risk of injury to a passenger sitting on the airplane seat 32f. The backrest impact safety device 14f decouples the backrest 10f from the seat component 12f in particular in the event of a crash in which there is deceleration counter to the flight direction 66f. In the event of a crash, the backrest impact safety device 14f at least partially reduces the impact forces which act on the backrest 10f, on account of which the force acting on a passenger who exerts the force on the backrest 10f is also reduced. The backrest 10f and the seat component 12f, configured as a transverse reinforcement unit, are intercoupled by means of the backrest impact safety device 14f. The backrest impact safety device 14f has a locked position and an unlocked position. The backrest impact safety device 14f is locked in the locked position, and the backrest 10f is fixedly coupled to the seat component 12f. The backrest 10f in the locked position of the backrest impact safety device 14f may not move in relation to the seat component 12f by way of the backrest impact safety device 14f. The backrest 10f is decoupled from the seat component 12f in the unlocked position and may be moved in relation to the seat component 12f. Herein, in the unlocked position of the backrest impact safety device 14f, the backrest 10f may be pivoted about an advantageous angle in relation to the seat component 12f.

The backrest impact safety device 14f decouples the backrest 10f from the seat component 12f prior to the impact forces on the backrest 10f taking effect. On account thereof, the backrest 10f in the event of a crash is decoupled from the seat component 12f before a passenger impacts the backrest 10f and transmits the impact forces to the backrest 10f. On account thereof, the backrest 10f, upon impact of the passenger on the backrest 10f, that is to say when the impact forces take effect, is partially decoupled from the seat component 12f and in this way may be moved in relation to the seat component 12f prior to or during the impact of the passenger on the backrest 10f, and in this way may absorb and/or advantageously deflect part of the impact forces such that an impact on the backrest 10f is less hard for the passenger.

The backrest 10f upon partial decoupling is provided for being locked in a locked position again. On account thereof, the backrest 10f, upon partial decoupling and the movement in relation to the seat component 12f that is thereby performed, may be locked in the locked position again. The locked position herein may be the same as that in which the backrest 10f is locked in the normal operating position; it is also conceivable, however, for the locked position in which the backrest 10f upon partial decoupling is locked again to be different from the locked position in the normal operating state. On account thereof, the backrest 10*f* upon readjustment from the locked position in the event of a crash, may again be secured in the locked position by a passenger, so as to in this way enable a safe escape path in which the backrest 10*f* is not in the way. Furthermore, upon locking of the backrest 10*f*, handhold loads may advantageously be reintroduced into the mounting unit of the airplane seat 32*f* by way of the locked backrest 10*f*, on account of which a passenger may advantageously hold on to the backrest 10*f*, without the latter being pivoted. The backrest impact safety device 14*f*, upon partial decoupling, is provided for being moved back to a locked position and, on account thereof, for locking the backrest 10*f* in the locked position again upon partial decoupling. In principle, it would also be conceivable for the airplane seat device to have a device which is configured separately from the backrest impact safety device 14*f* and which is provided for moving the backrest 10*f* to a locked position again upon partial decoupling. It is conceivable herein for the separately configured device to be constructed in a similar manner and to function like the backrest impact safety device 14*f* which is described hereunder. In principle, it is also conceivable for the separately configured device to have only the same effect as the backrest impact safety device 14*f* which is described hereunder, but for the former to be of different construction.

The backrest impact safety device 14*f* comprises a housing 80*f*. The housing 80*f* is provided for encapsulating the backrest impact safety device 14*f*. The housing 80*f* is configured as a closed housing. The housing 80*f* is configured as a cylinder. The housing 80*f*, configured as a cylinder, has a central axis which corresponds to a direction of main extent of the housing 80*f*. The housing 80*f* encloses an interior space. Herein, the housing 80*f* in a fitted state encloses the entire interior space. On account thereof, an ingress of liquids or dirt into the interior space of the housing 80*f* may be advantageously prevented, and a reliability of the backrest impact safety device 14*f* may be improved in this way. In principle, however, it is also conceivable for the housing 80*f* to be configured so as to be at least partially opened. The housing 80*f* comprises a linkage element 82*f*. The linkage element 82*f* is configured as a form-fitting element and is provided for rigid connection to a linkage element of equivalent configuration. The linkage element 82*f* is disposed at a first axial end of the housing 80*f*, thus configuring a first axial end of the backrest impact safety device 14*f*. The housing 80*f* is rigidly connectable to the backrest 10*f* by way of the linkage element 82*f*. In a fitted state, the backrest impact safety device 14*f* is connected to the backrest 10*f* by way of the linkage element 82*f* of the housing 80*f*. The backrest impact safety device 14*f* comprises an element 84*f* which is mounted so as to be axially displaceable in the housing 80*f*. The element 84*f* is configured as a piston element. The element 84*f*, configured as a piston element, in the fitted state extends into the interior space of the housing 80*f*. In the fitted state, a first axial end of the element 84*f* faces the first axial end of the housing 80*f*. By way of the first axial end, the element 84*f* extends from a second axial end of the housing 80*f* beyond a center between the first end and the second end of the housing 80*f*. The element 84*f* is configured so as to be at least substantially rotationally symmetrical, and has a central axis. Herein, at least one region of the element 84*f*, which region is disposed in the housing 80*f*, is configured so as to be rotationally symmetrical. The central axis of the element 84*f* in the fitted state is aligned so as to be coaxial with the central axis of the housing 80*f*. The element 84*f* protrudes from the housing 80*f* at the second axial end of the housing 80*f* that lies opposite the first axial end of the housing 80*f*. To this end, the housing 80*f* at the second axial end has a passage opening 98*f*. The element 84*f* comprises a linkage element 86*f*. The linkage element 86*f* is configured as a form-fitting element and is provided for rigid connection to a linkage element of equivalent configuration. The element 84*f* is rigidly connectable to the seat component 12*f* by way of the linkage element 86*f*. In a fitted state, the backrest impact safety device 14*f* is connected to the seat component 12*f* by way of the linkage element 86*f* of the element 84*f*. The linkage element 86*f* is disposed at a second axial end of the element 84*f*. On account thereof, the linkage element 86*f* configures a second axial end of the backrest impact safety device 14*f*. The backrest impact safety device 14*f* has a detent 156*f*. The detent 156*f* is provided for limiting the element 84*f* to a maximum position in the housing 80*f*. The detent 156*f* is configured by elevations which rise inwardly in the interior space of the housing 80*f*. The detent 156*f* delimits a movement of the element 84*f* in the housing 80*f* in the direction of the first axial end of the housing 80*f*. The element 84*f* in the locked position impacts the detent 156*f*. The element 84*f*, so as to contact the detent 156*f*, has an elevation 158*f* which in the locked position impacts the detent 156*f*.

The backrest impact safety device 14*f* has a locked position and an unlocked position. In principle, it is also conceivable for the backrest impact safety device 14*f* to have at least two locked positions which differ from one another. In the locked position of the backrest impact safety device 14*f*, the element 84*f* that is mounted so as to be axially displaceable in the housing 80*f* is rigidly connected to the housing 80*f*. In the locked position of the backrest impact safety device 14*f*, the element 84*f* cannot be displaced in the housing 80*f*. In the unlocked position of the backrest impact safety device 14*f*, the element 84*f* that is mounted so as to be axially displaceable in the housing 80*f* may be displaced by a defined displacement path. Herein, the element 84*f* may be moved from the locked position of the backrest impact safety device 14*f* in a triggering direction which is directed away from the linkage element 82*f* of the housing 80*f*. On account thereof, the backrest impact safety device 14*f* may be extended in length by way of a displacement of the element 84*f* from the locked position. A spacing between the linkage element 82*f* of the housing 80*f* and the linkage element 86*f* of the element 84*f* is enlarged by displacing the element 84*f* from the locked position in the triggering direction.

The backrest impact safety device 14*f* has at least one locking module 88*f* which blocks the backrest impact safety device 14*f* in a locked position. In the unlocked position, the locking module 88*f* at least partially decouples the backrest impact safety device 14*f*. The backrest impact safety device 14*f* is transferable from the unlocked position to the locked position by means of the locking module 88*f*. In the locked position of the backrest impact safety device 14*f*, the housing 80*f* and the element 84*f*, which is mounted so as to be axially displaceable, are intercoupled by way of the locking module 88*f*. The locking module 88*f* has two locking elements 90*f*, 92*f*, which are deflectable counter to an elastic force. The locking elements 90*f*, 92*f* are configured as pivotable lever elements. The locking elements 90*f*, 92*f* are disposed in the interior space of the housing 80*f*. The locking elements 90*f*, 92*f* are configured as elongate lever elements which have a main direction of extent which in the fitted state is aligned so as to be parallel with a main direction of extent of the housing 80*f*. The locking elements 90*f*, 92*f*, in a manner orthogonal to the main direction of extent thereof, each have a segment of a circle as cross section. The locking elements 90f, 92f herein are mutually disposed so as to be in a mirror image in relation to a central axis of the cylindrically configured housing 80f. The locking elements 90f, 92f each have one bearing point 94f, 96f by way of which the locking elements 90f, 92f are pivotably disposed in the housing 80f. To this end, the bearing points 94f, 96f each configure one first housing-side bearing element (not described in more detail) which is configured by the housing 80, and one second bearing element which is formed with by the respective locking element 90f, 92f. The bearing elements each are configured as a friction bearing. In principle, it would also be conceivable for roller bearings to be used for mounting the locking elements 90f, 92f. The bearing points 94f, 96f herein each are disposed on a side that faces the second axial end of the housing 80f. A forward axial end of the locking elements 90f, 92f that in the fitted state is assigned to the second axial end of the housing 80f, may be outwardly pivoted to an opened position by way of the bearing points 94f, 96f. The two locking elements 90f, 92f, at the rearward axial ends thereof which in the fitted state face the first axial end of the housing 80f, are intercoupled by way of a spring element 100f. The spring element 100f exerts a spring force on the locking elements 90f, 92f, pushing apart the locking elements 90f, 92f at the rearward axial end. The spring element 100f herein is configured as a helical spring. In principle, it would also be conceivable for the spring element to be configured as another spring element that is considered purposeful by a person skilled in the art. The spring element 100f, by way of the spring force thereof, pushes the locking elements 90f, 92f to a resting state. In the resting state, the locking elements 90f, 92f of the locking module 88f lock the backrest impact safety device 14f. In order for the backrest impact safety device 14f to be locked, the locking elements 90f, 92f at the forward end thereof each have one form-fitting element 102f, 104f. The form-fitting elements 102f, 104f herein each are configured as a toothed profile which is disposed on an inwardly directed internal side of the locking elements 90f, 92f. In principle, it is also conceivable for the form-fitting elements 102f, 104f to have another shape. The form-fitting elements 102f, 104f of the locking elements 90f, 92f configure a part of the locking module 88f that is fixedly connected to the housing. The form-fitting elements 102f, 104f are fixedly coupled to the housing 80f by way of the pivotable mounting of the locking elements 90f, 92f. For the form-fitting connection to the form-fitting elements 102f, 104f of the locking elements 90f, 92f, the element 84f has a form-fitting element 106f of a corresponding configuration. The form-fitting element 106f is configured as an encircling toothing on the element 84f, which toothing is configured so as to be complementary to the toothed profiles of the form-fitting elements 102f, 104f of the locking elements 90f, 92f. In the resting position of the locking elements 90f, 92f, the form-fitting elements 102f, 104f engage in the form-fitting element 106f which is formed by the element 84f. The element 84f and the housing 80f, by way of the connection between the form-fitting elements 102f, 104f, 106f, are rigidly interconnected by way of the locking elements 90f, 92. Herein, the spring element 100f, by way of the redirection by way of the bearing points 94f, 96f, pushes each of the form-fitting elements 102f, 104f into the form-fitting element 106f. On account thereof, a retention force is increased, and a greater force may be transmitted by way of the form-fitting connection between the form-fitting elements 102f, 104f of the locking elements 90f, 92f, and the form-fitting element 106f of the element 84f. In principle, it would also be conceivable for the locking module 88f to be constructed in a different manner and, for example, to deflect the locking elements 90f, 92 by an electromagnetic force in an unlocked position, and block by an electromagnetic force in a locked position.

The backrest impact safety device 14f comprises an inertia module 16f. The inertia module 16f is provided for at least partially unlocking the backrest impact safety device 14f in the event of a crash. In the normal operating state of the backrest impact safety device 14f, the inertia module 16f is disposed in a locked position. The locked position of the inertia module 16f herein is formed by a region in which the inertia module 16 may be disposed without the latter partially unlocking the backrest impact safety module 14f. The inertia module 16f is formed by a mass element 108f which is disposed so as to be axially displaceable in the interior space of the housing 80f. The mass element 108f is disposed at a first axial end of the housing 80f. The mass element 108f has a cylindrical shape. The mass element 108f is mounted in the interior space of the housing 80f by way of a friction bearing. The mass element 108f at the first end thereof which in the fitted state faces the first axial end of the housing 80f, has a flat wall. The mass element 108f at a second end which in the fitted state faces the locking elements 90f, 92f has an activation contour 110f. The activation contour 110f is of a concave configuration. The activation contour 110f has a conical shape. The activation contour 110f, from the first end of the mass element 108f, extends inward from a radially external region in the direction of the second end of the mass element 108f. The activation contour 110f is provided for deflecting the locking elements 90f, 92f from the resting position thereof. To this end, the mass element 108f, in order to deflect the locking elements 90f, 92f, is provided for pushing the locking elements 90f, 92f toward one another in each case at the rearward end thereof. In principle, it is also conceivable for the activation contour 110f to have another shape such as a spherical shape, an elliptical shape, or a mixed shaped, for example. A triggering deceleration may be set by the configuration of the activation contour 110f, and by the contour of the locking elements 90f, 92f, and the weight of the mass element 108f. A triggering speed may likewise be set.

The inertia module 16f for unlocking the backrest impact safety device 14f is provided for at least temporarily deflecting the locking elements 90f, 92f. In the event of a crash, the inertia module 16f for unlocking the backrest impact safety device 14f is provided for being deflected from the locked position thereof. The inertia module 16f herein is provided to be deflected from a locked position prior to the impact forces taking effect. If and when the inertia module 16f is deflected from the locked position thereof, the backrest impact safety device 14f reaches the unlocked position from the locked position. To this end, the inertia module 16f configures the mass element 108f. The mass element 108f is provided for imparting mass to the inertia module 16f, which mass by way of the mass inertia thereof in the event of a crash deflects the inertia module 16f in the backrest impact safety device 14f from the locked position of the former, at least partially unlocking the backrest impact safety device 14f by deflecting the locking elements 90f, 92f.

The backrest impact safety device 14f has at least one spring element 112f which is provided for holding the inertia module 16f in the locked position thereof. The spring element 112f is disposed in the interior space of the housing 80f. The spring element 112f in functional terms is disposed between the housing 80f and the inertia module 16f. The spring element 112f is supported on the housing 80f and exerts a spring force on the inertia module **16*f* which is mounted so as to be axially displaceable in the housing 80*f*. The spring element 112*f* by way of a first end bears on the mass element 108*f*. The spring element 112*f* by way of a second end is supported on an internal side of the housing 80*f* by way of a linkage region (not illustrated in more detail). The spring element 112*f* herein is disposed between the second end of the housing 80*f* and the mass element 108*f* of the inertia module 16*f*. The spring element 112*f* is configured as a compression spring. On account thereof, the mass element 108*f* of the inertia module 16*f* in the housing 80*f* is pushed in the direction of the first end of the housing 80*f*, into the locked position of said mass element 108*f*. In the event of a crash, the mass element 108*f* must move in the triggering direction, counter to the spring force of the spring element 112*f*, so as to unlock the backrest impact safety device 14*f*. A necessary acceleration which is required for partially unlocking the backrest impact safety device 14*f* may be set in a simple manner and thus be adapted to various airplane seat models and to other circumstances by way of the rigidity of the spring element 112*f* and/or by way of the mass of the mass element 108*f*. The spring element 112*f* herein is configured as a helical spring. In principle, it is also conceivable for the spring element 112*f*** to be configured as another spring element that is considered purposeful to a person skilled in the art, such as for example a gas-pressure spring, a magnetic and/or electric spring element, or a spring element which generates a restoring force by compression of a fluid.

The backrest impact safety device **14*f* comprises a deceleration element 30*f*. The deceleration element 30*f* is provided for absorbing inertia energy of the backrest 10*f* upon partial decoupling of the backrest impact safety device 14*f*. The deceleration element 30*f* in the event of a crash absorbs at least part of inertia forces which act on the backrest 10*f*. In order for the inertia energy to be absorbed the deceleration element 30*f* is provided for being elastically deformed. The deceleration element 30*f* is disposed in the interior space of the housing 80*f*. The deceleration element 30*f* in functional terms is disposed between the element 84*f* and the housing 80*f*. The deceleration element 30*f* upon partial decoupling is provided for slowing down a relative movement of the element 84*f* in relation to the housing 80*f* ahead of a terminal detent. The deceleration element 30*f* is configured as a sleeve that is capable of plastic deformation. The deceleration element 30*f* encloses the element 84*f* which is configured in the manner of a piston. The element 84*f* has an entrainment element 114*f*. The entrainment element 114*f* is fixedly connected to the element 84*f*. In principle, it is also conceivable for the entrainment element 114*f* to be configured so as to be integral to the element 84*f*. The deceleration element 30*f* is disposed between the entrainment element 114*f* and the second end of the housing 80*f*. If and when the element 84*f* upon partial decoupling is displaced in the triggering direction in the housing 80*f*, that is to say extending the backrest impact safety device 14*f* in length, the entrainment element 114*f* entrains the deceleration element 30*f* until the latter impacts an axial internal wall at the second end of the housing 80*f*. In the course of the further movement of the element 84*f* in the triggering direction the deceleration element 30*f* is jammed and plastically deformed between the entrainment element 114*f* and the internal wall at the second end of the housing 80*f*. A kinetic energy of the backrest 10*f* is converted to deformation energy and thus dissipated by the plastic deformation of the deceleration element 30*f*. On account thereof, the one readjustment of the element 84*f* in relation to the housing 80*f*, and thus a readjustment of the backrest 10*f*** upon partial decoupling, is decelerated in a damped manner prior to a maximum readjustment and is not abruptly slowed down.

A reaction of the airplane seat device having the backrest impact safety device **14*f* in the event of a crash is to be briefly described hereunder. FIG. 11 schematically shows the airplane seat device having the backrest impact safety device 14*f* in the locked position thereof. The inertia module 16*f* is in the locked position thereof. The housing 80*f* is rigidly connected to the element 84*f* by way of the locking module 88*f*. On account thereof, the linkage element 82*f* which is coupled to the backrest 10*f*, and the linkage element 86*f* which is coupled to the seat component 12*f*, are rigidly interconnected. Forces may be transmitted between the backrest 10*f* and the seat component 12*f* by way of the linkage elements 82*f*, 86*f*, by way of the backrest impact safety device 14*f*. Should any deceleration counter to the flight direction 66*f* now arise in the event of a crash, the backrest impact safety device 14*f* being aligned parallel with said flight direction 66*f*, the housing 80*f* which by way of the backrest 10*f* is coupled to the mounting unit is decelerated, and the inertia module 16*f* which is axially mounted in the housing 80*f* is deflected by way of the inertia of the former from the locked position thereof and is displaced in the direction of the second end of the housing 80*f*, counter to the spring force of the spring element 112*f*. The locking elements 90*f*, 92*f*, by way of the activation contour 110*f* of the mass element 108*f* of the inertia module 16*f*, are pivoted from the resting position of the former, and the form-fitting connection between the locking elements 90*f*, 92*f*, coupled to the housing 80*f*, and the element 84*f*, by way of the form-fitting elements 102*f*, 104*f*, 106*f* is cancelled. On account thereof, the backrest impact safety device 14*f* is partially unlocked. The element 84*f* may be displaced in the housing 80*f* in relation to the housing 80*f*. The backrest 10*f* is now at least partially decoupled from the seat component 12*f***.

By way of the partial decoupling of the backrest **10*f* from the seat component 12*f*, the backrest 10*f* may rotate about the bearing point 68*f* by means of which the backrest 10*f* is pivotably mounted. Herein, by virtue of mass inertia, a major part of the backrest 10*f* is accelerated in the direction of the flight direction 66*f* in the event of a crash. The major part of the backrest 10*f* moves in the direction of the flight direction 66*f* in the event of a crash. By virtue of the mass inertia, and by virtue of the pivotable mounting of the backrest 10*f* about the bearing point 68*f*, a lower region of the backrest 10*f* moves counter to the flight direction 66*f*. By way of the inertia of the backrest 10*f* a momentum about the bearing point 68*f* that pushes forward an upper end of the backrest 10*f* is introduced into the backrest 10*f*. A lower end at which the backrest impact safety device 14*f* is linked to the backrest 10*f* is moved counter to the flight direction 66*f*. Herein, the housing 80*f* by way of the coupling to the lower end of the backrest 10*f* is pulled backward, counter to the flight direction 66*f*. On account of the element 84*f* being released from the housing 80*f*, the element 84*f* which is axially mounted in the housing 80*f* may be displaced in relation to the housing 80*f*. The backrest impact safety device 14*f* is drawn apart by the movement of the backrest 10*f*, and a spacing between the linkage elements 82*f*, 86*f* is enlarged. The deceleration element 30*f* having the element 84*f* is entrained by way of the entrainment element 114*f*, and is also moved in relation to the housing 80*f*. The deceleration element 30*f* by way of the relative movement between the housing 80*f* and the element 84*f* is jammed between the entrainment element 114*f* and the housing 80*f*** and deformed.

On account thereof, the deceleration element 30*f* decelerates the relative movement between the housing 80*f* and the element 84*f*, and on account thereof the pivoting movement of the backrest 10*f*.

The backrest impact safety device 14*f* upon partial decoupling is provided to be moved back to a locked position. Through the returning of the backrest impact safety device 14*f* upon partial decoupling, the backrest 10*f* upon readjustment during the event of a crash may be blocked again, and an escape path may be advantageously kept free for a passenger. The backrest 10*f* after the event of a crash by way of the upper region thereof is pivoted forward in the flight direction 66*f*. If and when the backrest 10*f* is pivoted backward again, the housing 80*f* is displaced in the flight direction 66*f* again, and is thus displaced in relation to the element 84*f*. The locking elements 90*f*, 92*f*, held in the resting position thereof by the spring element 100*g*, are again deflected outward by the oblique toothing of the form-fitting element 106*f* which is formed by the element 84*f*. On account thereof, the form-fitting elements 102*f*, 104*f* can again be brought into engagement with the form-fitting element 106*f* of the element 84*f*. On account thereof, the housing 80*f* may again be rigidly coupled to the element 84*f*, and the backrest impact safety device 14*f* on account thereof may again be locked.

Figure 14:
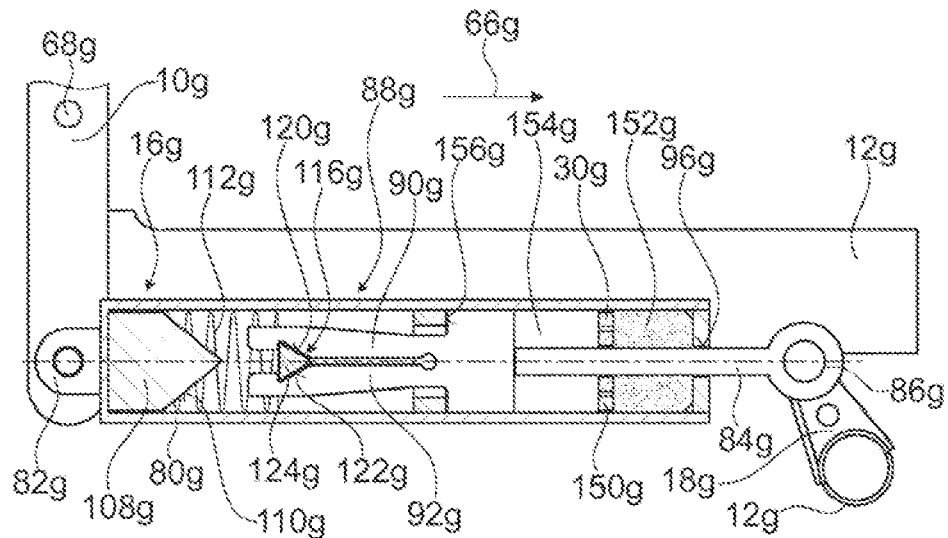
Figure 15:
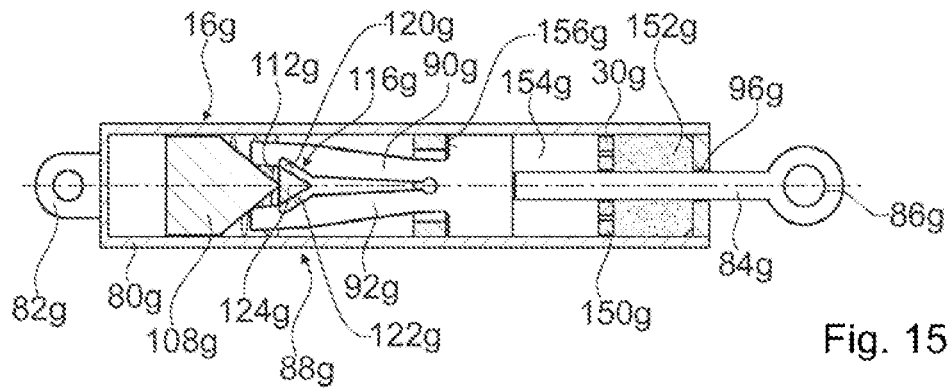
Figure 16:
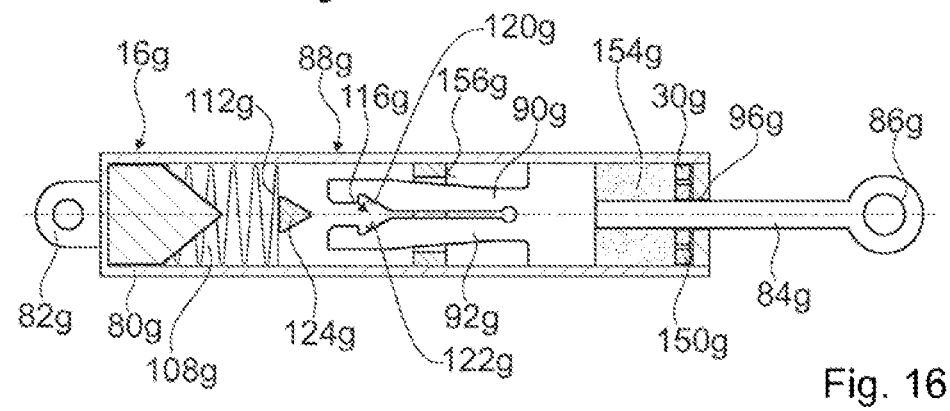
Figure 17:
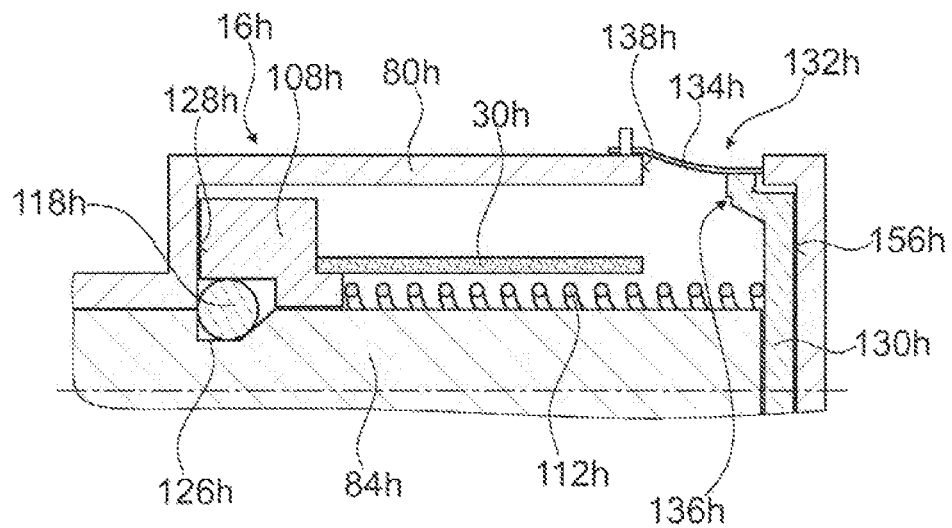
FIG. 17 shows a partially schematic sectional view of an airplane seat device according to the invention, in an eighth exemplary embodiment having a backrest impact safety device in a locked position.
Figure 18:
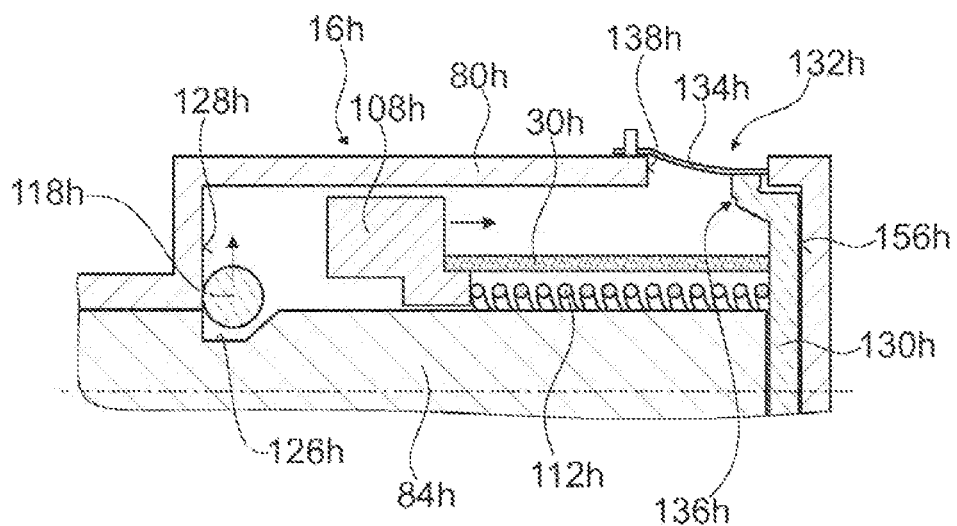
FIG. 18 shows a partially schematic sectional view of the backrest impact safety device during unlocking.

FIGS. 14 to 16 show an airplane seat device according to the invention in a seventh exemplary embodiment. The airplane seat device herein is part of a partially illustrated airplane seat 32*g*. The airplane seat 32*g* herein is part of an airplane (not illustrated in more detail). The airplane seat 32*g* in the fitted state herein is mounted in an airplane cabin of the airplane. The airplane seat device comprises a backrest 10*g*. The backrest 10*g* herein is provided so that a person sitting on the airplane seat 32*g*, of which the airplane seat device is a part, may support his/her back on the backrest 10*g*. The backrest 10*g* herein is pivotably articulated to a seat divider (not illustrated in more detail) by way of a bearing point 68*g*. The airplane seat device furthermore comprises a seat component 12*g*. The seat component 12*g* is configured as a transverse reinforcement unit which is provided for reinforcing the backrest 10*g* in the transverse direction of the transverse reinforcement unit. Moreover, the seat component 12*g*, configured as a transverse reinforcement unit, is provided for connecting the one side of the airplane seat 32*g*, of which the airplane seat device is a part, to the further side of the airplane seat 32*g*. The airplane seat device furthermore has a seat base 58*g*. In principle, it is also conceivable for the seat component 12*g* to be configured as a seat base or as a component of the seat structure. The seat base 58*g* configures a seat face. The seat base 58*g* is coupled to the backrest 10*g*.

The airplane seat device comprises a backrest impact safety device 14*g*. The backrest impact safety device 14*g* at least in a normal operating state is provided for rigidly connecting the backrest 10*g* to the seat component 12*g* in a locked position. In the normal operating state which reflects a normal and orderly use of the airplane seat 32*g*, forces may be transmitted from the backrest 10*g* into the seat component 12*g* by way of the backrest impact safety device 14*g*. The backrest impact safety device 14*g* is provided for partially decoupling the backrest 10*g* from the seat component 12*g* in at least an operating state. Through the partial decoupling of the backrest 10*g* from the seat component 12*g*, the backrest 10*g* and the seat component 12*g* in the event of a crash may exert a mutual relative movement, so as to reduce the risk of injury for a passenger sitting on the airplane seat 32*g*.

The backrest impact safety device 14*g* decouples the backrest 10*g* from the seat component 12*g* prior to the impact forces on the backrest 10*g* taking effect. The backrest 10*g* upon partial decoupling is provided for being locked in a locked position again. On account thereof, the backrest 10*g*, upon partial decoupling and following the movement in relation to the seat component 12*g* that is thereby performed, may be locked in the locked position again. The locked position herein may be the same as that in which the backrest 10*g* is locked in the normal operating position; it is also conceivable, however, for the locked position in which the backrest 10*g* upon partial decoupling is locked again to be different from the locked position in the normal operating state. The backrest impact safety device 14*g* comprises a housing 80*g*. The housing 80*g* is provided for encapsulating the backrest impact safety device 14*g*. The housing 80*g* comprises a linkage element 82*g*. The linkage element 82*g* is configured as a form-fitting element, and is provided for rigid connection to a linkage element of equivalent configuration. The linkage element 82*g* is disposed at a first axial end of the housing 80*g*, thus configuring a first axial end of the backrest safety impact device 14*g*. The housing 80*g* is rigidly connectable to the backrest 10*g* by way of the linkage element 82*g*. The backrest impact safety device 14*g* comprises an element 84*g* which is mounted so as to be axially displaceable in the housing 80*g*. The element 84*g* is configured as a piston element. The element 84*g*, configured as a piston element, in the fitted state extends in the interior space of the housing 80*g*. A first axial end of the element 84*g* in the fitted state faces the first axial end of the housing 80*g*. The element 84*g*, at a second axial end of the housing 80*g* that lies opposite the first axial end of the housing 80*g*, protrudes from the housing 80*g*. The element 84*g* comprises a linkage element 86*g*. The linkage element 86*g* is configured as a form-fitting element and is provided for rigid connection to a linkage element of equivalent configuration. The element 84*g* is rigidly connectable to the seat component 12*g* by way of the linkage element 86*g*. The backrest impact safety device 14*g* has a detent 156*g*. The detent 156*g* is provided for limiting the element 84*g* to a maximum position in the housing 80*g*. The detent 156*g* is configured by elevations which rise inwardly in the interior space of the housing 80*g*. In particular, the detent 156*g* is configured by a bushing which is incorporated in the interior space of the housing 80*g*. The detent 156*g* delimits a movement of the element 84*g* in the direction of the first axial end of the housing 80*g* in the housing 80*g*. The element 84*g* impacts the detent 156*g* in the locked position.

The backrest impact safety device 14*g* has at least one locking module 88*g* which in a locked position blocks the backrest impact safety device 14*g*. In particular the locking module 88*g* of the backrest impact safety device 14*g* differs from the locking module of the respective backrest impact safety device of the sixth exemplary embodiment of FIGS. 11 to 13. By contrast to the locking module of the respective backrest impact safety device of the sixth exemplary embodiment, the locking module 88*g* has two locking elements 90*g*, 92*g* which are configured as elastically deformable levers which are fixedly connected to the piston. The locking elements 90*g*, 92*g* are configured so as to be integral to the element 84*g*. The locking elements 90*g*, 92*g* are formed from an elastically deformable material. The locking elements 90*g*, 92*g* in the fitted state extend from the element 84*g* in the direction of a first end of the housing 80*g*. The locking elements 90*g*, 92*g* are disposed so as to be mutually spaced apart. The locking elements 90*g*, 92*g*, by way of a first end that faces the element 84*g* each are connected to the element 84g. The locking elements 90g, 92g in the direction of the second ends thereof that face away from the element 84g have an increasing spacing. The two locking elements 90g, 92g in the region of the second ends thereof conjointly configure a form-fitting element 116g. The form-fitting element 116g is formed by two mutually facing notches 120g, 122g in the internal sides of the locking elements 90g, 92g. The notches 120g, 122g in the locking elements 90g, 92g face one another. The notches 120g, 122g herein are incorporated in the respective locking element 90g, 92g at an identical spacing from the element 84. The two notches 120g, 122g, in a non-deflected state of the locking elements 90g, 92g, conjointly configure a triangular shape. A tip of the triangular form-fitting element 116g herein is directed in the direction of the element 84g. The locking module 88g has a form-fitting element 124g which is fixedly connected to the housing. The form-fitting element 124g is rigidly connected to the housing 80g. The form-fitting element 124g extends transversely through the interior space of the housing 80g. The form-fitting element 124g herein is configured so as to be equivalent to the form-fitting element 116g which is configured by the locking elements 90g, 92g. The form-fitting element 124g has a triangular cross section. In principle, it is also conceivable for the form-fitting element 124g to have another cross section such as a semi-circular shape, a circular shape, or an elliptic shape, for example. The respective form-fitting element 116g configured by the locking elements 90g, 92g would be configured so as to be accordingly equivalent. The form-fitting element 124g herein is formed by a triangular bolt which is routed through the interior space of the housing 80g. The bolt which forms the form-fitting element 124g herein is fixedly connected to the housing 80g. In the locked position of the backrest impact safety device 14g, the locking elements 90g, 92g embrace the form-fitting element 124g. The form-fitting element 124g in the locked position is disposed in the notches 120g, 122g of the locking elements 90g, 92g that form the form-fitting element 116g. On account thereof, the form-fitting element 124g and the form-fitting element 116g are interconnected in a form-fitting manner. On account thereof, the backrest impact safety device 14g is locked, and a force may be transmitted between the backrest 10g and the seat component 12g by way of the backrest impact safety device 14g.

The backrest impact safety device 14g comprises an inertia module 16g. The inertia module 16g is provided for at least partially unlocking the backrest impact safety device 14g in the event of a crash. The inertia module 16g is configured so as to be substantially identical to the inertia module of the sixth exemplary embodiment of FIGS. 11 to 13. The inertia module 16g is formed by a mass element 108g which is disposed so as to be axially displaceable in the interior space of the housing 80g. The mass element 108g is disposed at a first axial end of the housing 80g. By contrast to the mass element of the inertia module of the sixth exemplary embodiment of FIGS. 11 to 13, the mass element 108g has a differently molded activation contour 110g. The activation contour 110g is of convex configuration. The activation contour 110g has a convex conical shape. The activation contour 110g from a first end of the mass element 108g that faces the locking elements 90g, 92g, extends inward from a radially external region in the direction of the locking elements 90g, 92g. By way of the activation contour 110g which is configured in a convex wedge-like manner, the inertia module 16g is provided for releasing the form-fitting connection between the form-fitting elements 116g, 124g. To this end, the activation contour 110g which is configured in a convex wedge-like manner is provided for pushing apart the locking elements 90g, 92g so as thus to release the form-fitting element 124, fixedly connected to the housing, from the enlacement of the form-fitting element 116g that is formed by the locking elements 90g, 92g. The activation contour 110g is provided for deflecting the locking elements 90g, 92g from the resting position thereof. The mass element 108g, for deflecting the locking elements 90g, 92g, is provided for pushing apart each of the locking elements 90g, 92g at the second end thereof.

The backrest impact safety device 14g has at least one spring element 112g which is provided for holding the inertia module 16g in the locked position thereof. The backrest impact safety device 14g comprises a deceleration element 30g. The deceleration element 30g is provided for absorbing inertia energy of the backrest 10g upon partial decoupling of the backrest impact safety device 14g. In functional terms, the deceleration element 30g is configured so as to be identical to the respective deceleration element of the backrest impact safety device of the sixth exemplary embodiment of FIGS. 11 to 13. In terms of the design embodiment, the deceleration element 30g differs from the respective deceleration element of the backrest impact safety device of the sixth exemplary embodiment of FIGS. 11 to 13. The deceleration element 30g is configured as a damper element. The deceleration element 30g, configured as a damper element, is provided for absorbing kinetic energy without plastic deformation. The deceleration element 30g is configured as a gas compression spring. The deceleration element 30g is provided for absorbing energy by a fluid flow. The deceleration element 30g has an aperture 150g which mutually separates two chambers 152g, 154g. The aperture 150g is fixedly connected to the element 84g.

The aperture 150g mutually separates the two chambers 152g, 154g in the interior of the housing from radially inside, from the element 84g, to radially outside, to the housing 80g. The aperture 150g has a plurality of passage bores (not illustrated in more detail) by way of which the two chambers 152g, 154g that are mutually separated by the aperture 150g are in fluidic communication. A fluid from the one chamber 152g may reach the other chamber 154g through the passage bores. The fluid herein may be a gas or a liquid. In principle, it is conceivable for the passage bores in a normal state to be closed by membranes which in the event of a crash are destroyed by the movement of the element 84g and of the fluid, thus exposing the passage bores. If and when the element 84g in the event of a crash is moved in relation to the housing 80g, the chamber 152g is reduced in size by the aperture 150g, and the fluid disposed in the chamber flows through the passage bores of the aperture 150g into the chamber 154g. On account thereof, energy is dissipated, and the backrest 10g is decelerated. A functional mode of the deceleration element 30g in the event of a crash corresponds to that of the previous exemplary embodiment.

As in the case of the backrest safety impact device of the sixth exemplary embodiment, the backrest impact safety device 14g upon partial decoupling may be latched into the locked position again. Herein, in a manner analogous to the sixth exemplary embodiment, the element 84g by way of a movement of the backrest 10g is moved in relation to the housing 80g such that the form-fitting element 116g of the locking elements 90g, 92g, and the form-fitting element 124g, fixedly connected to the housing, reengage. To this end, the locking elements 90g, 92g are again pushed by way of the form-fitting element 124g, snap-fitting again with the notches 120g, 122g thereof into the form-fitting element 124g by way of a restoring force which is generated by the deflection of the locking elements 90g, 92g. On account thereof, the backrest impact safety device 14g is again in the locked position, and the backrest 10g is locked again.

FIGS. 17 to 20 show an airplane seat device according to the invention in an eighth exemplary embodiment. The airplane seat device herein is part of an airplane seat (not illustrated in more detail). The airplane seat device comprises a backrest and a seat component that correspond to those of the preceding exemplary embodiments and that are not described in more detail herein. The seat component is configured as a transverse reinforcement unit which is provided for reinforcing the backrest in the transverse direction of the transverse reinforcement unit. The airplane seat device comprises a backrest impact safety device 14h. The backrest impact safety device 14h at least in a normal operating state is provided for rigidly connecting the backrest and the seat component in a locked position. The backrest impact safety device 14h is connected to the backrest and to the seat component in a manner corresponding to the backrest impact safety devices of the preceding exemplary embodiments. In the normal operating state which reflects a normal and orderly use of the airplane seat, forces may be transmitted from the backrest to the seat component by way of the backrest impact safety device 14h. The backrest impact safety device 14h is provided for partially decoupling the backrest from the seat component in at least an operating state. The backrest impact safety device 14h decouples the backrest from the seat component prior to the impact forces on the backrest taking effect. The backrest is provided for being locked in a locked position again upon partial decoupling.

The backrest impact safety device 14h comprises a housing 80h. The housing 80h is provided for encapsulating the backrest impact safety device 14h. The housing 80h comprises a linkage element (not illustrated in more detail) by way of which the housing 80h in the fitted state is coupled to the seat component. The backrest impact safety device 14h comprises an element 84h which is mounted so as to be axially displaceable in the housing 80h. The element 84h is configured as a piston element. The element 84h, configured as a piston element, in the fitted state extends into the interior space of the housing 80h. The element 84h comprises a linkage element (not illustrated in more detail) by way of which the element 84h in the fitted state is coupled to the backrest.

The backrest impact safety device 14h has a locking module 88h which in a locked position blocks the backrest impact safety device 14h. In particular the locking module 88h of the backrest impact safety device 14h differs from the locking module of the respective backrest impact safety device of the preceding exemplary embodiments. The locking module 88h comprises a coupling element 118h. The coupling element 118h is configured as a ball. The housing 80h and the element 84h in a locked position are interconnected by the coupling element. The element 84h has a depression 126h in which the coupling element 118h, configured as a ball, is disposed in the locked position. For the sake of clearer illustration, the depression 126h herein is not drawn to scale in the figures. The depression 126h is not as deep as illustrated in the figures, so as to prevent canting of the coupling element 118h. The housing 80h configures a shoulder 128h. In the locked position, the coupling element 118h bears on the depression 126h and on the shoulder 128h in a form-fitting manner. On account thereof, the housing 80h and the element 84h in the locked position are interconnected by the coupling element 118h. The backrest impact safety device 14h comprises an inertia module 16h. In order for the coupling element 118h to be secured in the locked position, the backrest impact safety device 14h has an inertia module 16h. The inertia module 16h is furthermore provided for at least partially unlocking the backrest impact safety device 14h in the event of a crash. The inertia module 16h is formed by a mass element 108h which is disposed so as to be axially displaceable in the interior space of the housing 80h. In the locked position, the inertia module 16h is disposed above the coupling element 118h, thus holding the coupling element 118h in the depression 126h of the element 84h. The form-fitting connection between the housing 80h and the element 84h is secured by way of the inertia module 16h. If and when the inertia module 16h is deflected counter to a flight direction in the event of a crash, the inertia module 16h releases the coupling element 118h, releasing the form-fit between the housing 80h and the element 84h by way of the coupling element 118h. On account thereof, the backrest impact safety device 14h is at least partially unlocked, and the element 84h may be axially displaced in the housing 80h. In principle, it is also conceivable for the backrest impact safety device 14h to have further coupling elements 118h and depressions 126h by way of which the housing 80h and the element 84h are interconnected in a form-fitting manner.

The backrest impact safety device 14h has a spring element 112h which is provided for holding the inertia module 16h in the locked position thereof. The spring element 112h is configured in a manner corresponding to that of the preceding exemplary embodiments. The spring element 112h is configured as a helical spring. The spring element 112h is disposed between the inertia module 16h and a support wall 130h of the element 84h. In the locked position, the element 84h by way of the support wall 130h bears on an internal wall of the housing 80h.

The housing 80h on the circumference thereof has an opening 132h. In principle, it is also conceivable for the housing 80h on the circumference thereof to have further such openings 132h, for which the following description may also be used. The opening 132h is disposed at a rearward end of the housing 80h. The support wall 130h protrudes into the opening 132h of the housing 80h. The backrest impact safety device 14h has a leaf-spring element 134h. The leaf-spring element 134h is fixedly linked to an external side of the housing 80h, protruding into the opening 132h. By way of a loose end, the leaf-spring element 134h in the locked position bears on the support wall 130h of the element 84h (see FIG. 17). The support wall 130h has a default breaking point 136h level with a lower edge of the opening 132h. The region above the default breaking point 136h is provided for being severed at an edge 138h of the opening 132h during the event of a crash, if and when the element 84h is axially displaced within the housing 80h (see FIG. 19). If and when the region above the default breaking point 136h is severed, the support wall 130h may be displaced within the housing 80h. As an alternative to the default breaking point 136c, it would also be conceivable for the support wall 130h to have an articulation which designs the region above the articulation so as to be pivotable. It would be conceivable herein for the support wall to have an integral hinge instead of the default breaking point, by way of which integral hinge the upper region is capable of being folded down if and when said upper region impacts on the edge 138h of the opening 132.

The backrest impact safety device 14h has a detent 156h. The detent 156h is provided for limiting the element 84h to a maximum position in the housing 80h. The detent 156h is formed by the support wall 130*h* which is supported on the housing 80*h*. The detent 156*h* limits a movement of the element 84*h* in the direction of the rearward end of the housing 80*h* in the housing 80*h*. In the locked position, the detent 156*h* impacts the rearward end of the housing 80*h*.

In the event of a crash, the inertia module 16*h* is first deflected counter to the spring force of the spring element 112*h*. The coupling element 118*h* is released by the deflection of the inertia module 16*h*, and the form-fit between the housing 80*h* and the element 84*h* by way of the coupling element 118*h* is cancelled. On account thereof, the acceleration required for unlocking the backrest impact safety device 14*h* may be conceived in a particularly simple and advantageous manner, since only the mass of the mass element 108*h* and the spring force of the spring element 112*h* influence this required acceleration. The element 84*h* is displaced in relation to the housing 80*h* counter to the flight direction by the deflection of the backrest in the crash. If and when the upper region of the support wall 130*h* of the element 84*h* impacts the edge 138*h* of the opening 132*h*, said element 84*h* is severed and the element 84*h* conjointly with the support wall 130*h* is displaced farther, counter to the flight direction. The backrest impact safety device 14*h* comprises a deceleration element 30*h*. The deceleration element 30*h* in the event of a crash absorbs at least part of inertia forces which act on the backrest. For absorbing the inertia energy the deceleration element 30*h* is provided to be plastically deformed. The deceleration element 30*h* is disposed between the inertia module 16*h* and the support wall 130*h*. If and when the element 84*h* is displaced by a defined displacement path, the deceleration element 30*h* is jammed and deformed between the inertia module 16*h* which is supported on the shoulder 128*h* of the housing 80*h* and the support wall 130*h*, on account of which said deceleration element 30*h* absorbs energy (see FIG. 19). Upon partial unlocking, the backrest may be moved back to a locked position by way of the backrest impact safety device 14*h*. To this end, the element 84*h* is pushed back into the housing 80*h* again. Herein, the support wall 130*h* of the element 84*h* is jammed between an internal wall of the housing 80*h* and the leaf-spring element 134*h*, and is thus locked in the locked position.

FIG. 21 shows an airplane seat device according to the invention in a ninth exemplary embodiment. The airplane seat device herein is part of a partially illustrated airplane seat 32*i*. The airplane seat 32*i* herein is part of an airplane (not illustrated in more detail). The airplane seat 32*i* herein in a fitted state is mounted in an airplane cabin of the airplane. The airplane seat device comprises a backrest 10*i*. The backrest 10*i* herein is provided so that a person sitting on the airplane seat 32*i*, of which the airplane seat device is a part, may support his/her back on the backrest 10*i*. The backrest 10*i* herein is pivotably articulated on a seat divider (not illustrated in more detail) by way of a bearing point 68*i*. The airplane seat device furthermore comprises a seat component 12*i*. The seat component 12*i* is configured as a transverse reinforcement unit which is provided for reinforcing the backrest 10*i* in the transverse direction of the transverse reinforcement unit. Moreover, the seat component 12*i*, configured as a transverse reinforcement unit, is provided for connecting the one side of the airplane seat 32*i*, of which the airplane seat device is a part, to the further side of the airplane seat 32*i*. The airplane seat device furthermore has a seat base 58*i*. In principle, it is also conceivable for the seat component 12*i* to be configured as a seat base or as a component of the seat structure. The seat base 58*i* configures a seat face. The seat base 58*i* is coupled to the backrest 10*i*.

The airplane seat device comprises a backrest impact safety device 14*i*. The backrest impact safety device 14*i* at least in a normal operating state is provided for rigidly connecting the backrest 10*i* to the seat component 12*i* in a locked position. In the normal operating state which reflects a normal and orderly use of the airplane seat 32*i*, forces may be transmitted from the backrest 10*i* to the seat component 12*i* by way of the backrest impact safety device 14*i*. The backrest impact safety device 14*i* is provided for partially decoupling the backrest 10*i* from the seat component 12*i* in at least an operating state. Through the partial decoupling of the backrest 10*i* from the seat component 12*i*, in the event of a crash, the backrest 10*i* and the seat component 12*i* may perform a mutually relative movement so as thus to reduce the risk of injury for a passenger sitting on the airplane seat 32*i*. The backrest impact safety device 14*i* herein is configured like a backrest impact safety device as described in the preceding exemplary embodiments.

The airplane seat device comprises an additional force element 140*i*. The additional force element 140*i* is provided for at least temporarily accelerating the backrest 10*i* immediately prior to partial decoupling. The additional force element 140*i* herein is configured as a gas compression spring. In principle, it is also conceivable for the additional force element 140*i* to be configured as a mechanical spring element or as an electro-magnetic spring element. In principle, it is likewise conceivable for the additional force element 140*i* to be configured as a pyrotechnical element which provides the additional force thereof by a pyrotechnical effect. The additional force element 140*i* in functional terms is disposed between the backrest 10*i* and the seat component 12*i*. The additional force element 140*i* herein in functional terms is disposed between a housing 80*i* of the backrest impact safety device 14*i* and an element 84*i* which is disposed so as to be movable in the housing 80*i*. In order to be linked to the housing 80*i*, the additional force element 140*i* has a first linkage point 142*i* by way of which the additional force element 140*i* is rigidly connected to the housing 80*i*. The linkage point 142*i* is disposed on a housing 144*i* of the additional force element 140*i*. The additional force element 140*i* has a second linkage point 146*i* by way of which the additional force element 140*i* is rigidly connected to the element 84*i* of the backrest impact safety device 14*i*. The linkage point 146*i* is disposed on a deployable piston 148*i* of the additional force element 140*i*.

In the locked position of the backrest impact safety device 14*i* the additional force element 140*i* is disposed so as to be pretensioned between the two linkage points 142*i*, 146*i* thereof. The additional force element 140*i* provides a spring force which pushes apart the mutually movable parts of the backrest impact safety device 14*i*, such as in particular the housing 80*i* and the element 84*i*. In the locked state of the backrest impact safety device 14*i* the additional force element 140*i* has no influence on the system. If and when the backrest impact safety device 14*i* is unlocked during the event of the crash, the additional force element 140*i* is able to provide the spring force thereof and in this way push apart the element 84*i* and the housing 80*i*. The spring force that is provided by the additional force element 140*i* herein acts in the same direction as the deceleration force during the event of the crash. On account thereof, a readjustment of the backrest 10*i* is initially accelerated. On account thereof a risk of injury for a passenger may be advantageously reduced, since the backrest is additionally accelerated and an impact force of a head of a passenger sitting on the rearward air passenger seat on the backrest 10*i* can be reduced, since a speed differential between the head of the passenger and the backrest can be advantageously reduced. Upon additional acceleration of the backrest 10*i* by the additional force element 140*i*, the backrest 10*i* as is the case in the preceding exemplary embodiments is decelerated by a deceleration element which is not to be described in more detail herein. A description of the deceleration element and of all other elements of the airplane seat device that are not illustrated or described in more detail herein may be derived from the preceding exemplary embodiments.

LIST OF REFERENCE SIGNS

10 Backrest
12 Seat component
14 Backrest impact safety device
16 Inertia module
18 Linkage element
20 Housing element
22 Knuckle joint
24 Form-fitting element
26 Guide element
28 Guide element
30 Deceleration element
32 Airplane seat
34 Deflection unit
36 Bolt
38 Receptacle
40 Hinged bracket
42 Hinged bracket
44 Pin element
46 Bearing element
48 Form-fitting element
50 Guide element
52 Pin element
54 Pin element
56 Interior space
58 Seat base
60 Activation elevation
62 Clearance
64 Activation face
66 Flight direction
68 Bearing point
70 Blocking element
72 Pin element
74 Form-fitting element
76 Guide element
78 Retaining element
80 Housing
82 Linkage element
84 Element
86 Linkage element
88 Locking module
90 Locking element
92 Locking element
94 Bearing point
96 Bearing point
98 Passage opening
100 Spring element
102 Form-fitting element
104 Form-fitting element
106 Form-fitting element
108 Mass element
110 Activation contour
112 Spring element
114 Entrainment element
116 Form-fitting element
118 Coupling element
120 Notch
122 Notch
124 Form-fitting element
126 Depression
128 Shoulder
130 Support wall
132 Opening
134 Leaf-spring element
136 Default breaking point
138 Edge
140 Additional force element
142 Linkage point
144 Housing
146 Linkage point
148 Piston
150 Aperture
152 Chamber
154 Chamber
156 Detent
158 Elevation

The invention claimed is:

1. An airplane seat device having at least one backrest, at least one seat component that is coupled to the backrest, and a backrest impact safety device which by way of partial decoupling of the backrest from the seat component is provided for at least partially reducing impact forces on the backrest at least in an event of a crash, wherein
the backrest impact safety device is provided for decoupling the backrest from the seat component prior to the impact forces taking effect,
the backrest impact safety device has at least one inertia module, which is provided for decoupling the backrest impact safety device at least in the event of a crash, and
the backrest impact safety device comprises at least one knuckle joint, which, in a normal operating state, is provided for being coupled to the inertia module.

2. An airplane seat having at least one airplane seat device as claimed in claim 1.

3. The airplane seat device as claimed in claim 1, wherein the inertia module is provided for locking the backrest impact safety device at least in the normal operating state.

4. The airplane seat device as claimed in claim 1, wherein the inertia module is provided for being deflected from a locked position for unlocking the backrest impact safety device in the event of a crash.

5. The airplane seat device as claimed in claim 1, wherein the inertia module, in the event of a crash, is provided for being deflected from a locked position prior to the impact forces taking effect.

6. The airplane seat device as claimed in claim 1, wherein at least one additional force element which immediately upon partial decoupling is provided at least for at least temporarily accelerating the backrest.

7. The airplane seat device as claimed in claim 1, wherein the backrest impact safety device comprises a housing element in which the inertia module is mounted to be axially displaceable.

8. The airplane seat device as claimed in claim 1, wherein the knuckle joint has at least one form-fitting element, which, in a locked position, is provided for being connected to the inertia module in a form-fitting manner.

9. The airplane seat device as claimed in claim 1, wherein a housing element has at least one guide element by way of which the inertia module is disposed in the housing element to be axially displaceable.

10. The airplane seat device as claimed in claim 1, wherein the backrest impact safety device comprises at least one linkage element, which is provided for coupling to the seat component.

11. The airplane seat device as claimed in claim 10, wherein a housing element has at least one guide element in which the linkage element by way of a first end is fastened to be axially displaceable.

12. The airplane seat device as claimed in claim 10, wherein the knuckle joint is connected to a housing element and to the linkage element in an articulated manner.

13. The airplane seat device as claimed in claim 10, wherein the backrest impact safety device has at least one deceleration element, which is provided for absorbing inertia energy of the backrest following a triggering of the backrest impact safety device.

14. An airplane seat device having at least one backrest, at least one seat component that is coupled to the backrest, and a backrest impact safety device, which, by way of partial decoupling of the backrest from the seat component, is provided for at least partially reducing impact forces on the backrest at least in an event of a crash, wherein
the backrest impact safety device is provided for decoupling the backrest from the seat component prior to the impact forces taking effect,
the backrest impact safety device has at least one inertia module, which is provided for decoupling the backrest impact safety device at least in the event of a crash, and
the backrest impact safety device comprises at least one knuckle joint that has at least one form-fitting element which, in a locked position, is provided for being connected to the inertia module in a form-fitting manner.

15. An airplane seat device comprising:
at least one backrest; and
at least one mounting unit, wherein
the at least one backrest is disposed to be pivotable in relation to the mounting unit,
the mounting unit is adapted to mount an aircraft seat, of which the backrest is a part, to a cabin floor,
the airplane seat device has at least one seat component, which is coupled to the backrest, and a backrest impact safety device, which, by way of partial decoupling of the backrest from the seat component, is provided for at least partially reducing impact forces on the backrest at least in an event of a crash,
the backrest impact safety device is provided for decoupling the backrest from the seat component prior to the impact forces taking effect, and
by way of the partial decoupling of the backrest from the seat component, the backrest may rotate about a bearing point, by which the backrest is pivotally mounted.

* * * * *